(12) United States Patent
Cha et al.

(10) Patent No.: US 11,740,519 B2
(45) Date of Patent: Aug. 29, 2023

(54) DISPLAY DEVICE

(71) Applicant: Samsung Display Co., Ltd., Yongin-Si (KR)

(72) Inventors: Na Hyeon Cha, Yongin-si (KR); Si Hyun Ahn, Hwaseong-si (KR); Byoung Sun Na, Seoul (KR); Sun Kwun Son, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 211 days.

(21) Appl. No.: 17/088,166

(22) Filed: Nov. 3, 2020

(65) Prior Publication Data

US 2021/0208463 A1  Jul. 8, 2021

(30) Foreign Application Priority Data

Jan. 7, 2020  (KR) .......................... 10-2020-0002202
Apr. 29, 2020  (KR) .......................... 10-2020-0052679

(51) Int. Cl.
*G02F 1/1362* (2006.01)
*G02F 1/1343* (2006.01)
(Continued)

(52) U.S. Cl.
CPC ...... *G02F 1/136286* (2013.01); *G02F 1/1368* (2013.01); *G02F 1/134309* (2013.01);
(Continued)

(58) Field of Classification Search
CPC ......... G02F 1/136286; G02F 1/134309; G02F 1/136213; G02F 1/1368; G02F 2201/123;
(Continued)

(56) References Cited

U.S. PATENT DOCUMENTS

| 2012/0127412 | A1* | 5/2012 | Lee ................... G02F 1/136286 349/139 |
| 2012/0153310 | A1* | 6/2012 | Kwak ............... G02F 1/134363 257/E21.531 |

(Continued)

FOREIGN PATENT DOCUMENTS

| KR | 10-2015-0044514 A | 4/2015 |
| KR | 10-2015-0097857 A | 8/2015 |

(Continued)

*Primary Examiner* — Charles S Chang
(74) *Attorney, Agent, or Firm* — Innovation Counsel LLP

(57) ABSTRACT

The display device includes data lines, first gate lines arranged in parallel with the data lines, second gate lines intersecting the first gate lines, a line contact portion in which each of the plurality of first gate lines and each of the plurality of second gate lines are in contact with each other, a non-contact portion in which each of the plurality of first gate lines and each of the plurality of second gate lines are insulated from each other in an intersection area thereof, a first pixel including a first switching element connected to a corresponding second gate line among the second gate lines, and a second pixel including a second switching element connected to the second gate line connected to the first pixel, wherein magnitude of a first capacitance of the first switching element is different from magnitude of a first capacitance of the second switching element.

26 Claims, 24 Drawing Sheets

(51) Int. Cl.
  *G02F 1/1368*    (2006.01)
  *G09G 3/36*      (2006.01)
  *G09G 3/00*      (2006.01)
(52) U.S. Cl.
  CPC ....... *G02F 1/136213* (2013.01); *G09G 3/006* (2013.01); *G09G 3/3688* (2013.01); *G09G 3/3696* (2013.01); *G02F 2201/123* (2013.01); *G09G 2300/0408* (2013.01)
(58) Field of Classification Search
  CPC .... G09G 3/006; G09G 3/3688; G09G 3/3696; G09G 2300/0408
  USPC ......................................................... 349/139
  See application file for complete search history.

(56) References Cited

U.S. PATENT DOCUMENTS

2018/0151134 A1* 5/2018 Choi .................... G09G 3/3688
2020/0142268 A1* 5/2020 Shin ................. G02F 1/136286

FOREIGN PATENT DOCUMENTS

KR   10-2016-0119398 A   10/2016
KR       10-2033619 B1   10/2019

\* cited by examiner

DISPLAY DEVICE

This application claims priority from Korean Patent Application No. 10-2020-0002202, filed on Jan. 7, 2020, and No. 10-2020-0052679, filed on Apr. 29, 2020, in the Korean Intellectual Property Office, the disclosure of which is incorporated herein by reference in its entirety.

BACKGROUND

1. Technical Field

The present disclosure relates to a display device, and more particularly to a display device capable of preventing spots caused by luminance variations of a plurality of pixels.

2. Description of the Related Art

Recently, demands for various types of display devices for displaying images have increased. For example, display devices are applied to various electronic appliances such as smart phones, digital cameras, notebook computers, navigators, and smart televisions. A display device may be a flat panel display device such as a liquid crystal display device, a field emission display device, or an organic light emitting display device.

Typically, a liquid crystal display device includes two substrates facing each other, a pixel electrode, a liquid crystal layer, and a common electrode disposed between the two substrates. The liquid crystal display device determines the alignment of liquid crystal molecules using an electric field formed between the pixel electrode and the common electrode and controls the polarization of incident light, thereby displaying an image. Recently, research and development have been conducted on technologies for minimizing a bezel area of a liquid crystal display. However, there are still a lot of problems in displaying images on different display devices such as degradation or spotting. Thus, there is need to develop a novel display device to prevent spotting or degradation to improve display quality.

SUMMARY

Aspects of the present disclosure are to provide a display device capable of compensating for a difference in kick-back voltage according to capacitance difference between a plurality of vertical gate lines and a plurality of pixel electrodes, thereby preventing spots caused by luminance variations of a plurality of pixels.

Aspects of the present disclosure are to provide a method of inspecting a display device, in which lighting inspection is performed by using a data pad unit and a gate driver disposed at one side of a substrate.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an embodiment, there is provided a display device, including: a plurality of data lines extending in a first direction; a plurality of first gate lines arranged in parallel with the plurality of data lines; a plurality of second gate lines intersecting the plurality of first gate lines; a line contact portion in which each of the plurality of first gate lines and each of the plurality of second gate lines are in contact with each other; non-contact portion insulated from each other in an intersection area of the plurality of first gate lines and the plurality of second gate lines; a first pixel including a first switching element connected to a corresponding second gate line among the plurality of second gate lines and disposed adjacent to the line contact portion; and a second pixel including a second switching element connected to the second gate line connected to the first pixel and disposed adjacent to the non-contact portions, wherein magnitude of a first capacitance of the first switching element between a gate electrode and a first electrode of the first switching element is different from magnitude of a first capacitance of the second switching element between a gate electrode and a first electrode of the second switching element.

The magnitude of the first capacitance of the first switching element may be smaller than the magnitude of the first capacitance of the second switching element.

The first electrode of the first switching element may be connected to a first pixel electrode of the first switching element and the first electrode of the second switching element may be connected to a second pixel electrode of the second switching element and wherein a size of an overlapping area of the gate electrode and the first electrode of the first switching element may be smaller than a size of an overlapping area of the gate electrode and the first electrode of the second switching element.

A size of the gate electrode of the first switching element may be smaller than a size of the gate electrode of the second switching element.

A size of an active region of the first switching element may be smaller than a size of an active region of the second switching element.

The first electrode of the first switching element may be connected to a first pixel electrode of the first switching element and the first electrode of the second switching element may be connected to a second pixel electrode of the second switching element, and wherein a size of the first electrode of the first switching element may be smaller than a size of the first electrode of the second switching element.

Magnitude of a second capacitance of the first switching element between a first pixel electrode of the first pixel and an adjacent first gate line among the plurality of first gate lines may be different from magnitude of a second capacitance of the second switching element between a second pixel electrode of the second pixel and an adjacent first gate line among the plurality of first gate lines.

The magnitude of the second capacitance of the first switching element may be greater than the magnitude of the second capacitance of the second switching element.

When the gate electrode of the first switching element receives a gate-on voltage from the second gate line, a first gate line adjacent to the first pixel, among the plurality of first gate lines, may supply a gate-on voltage.

When the gate electrode of the second switching element receives a gate-on voltage from the second gate line, a first gate line adjacent to the second pixel, among the plurality of first gate lines, may have a gate-off voltage.

According to another embodiment there is provided a display device, including: a plurality of first gate lines extending in a first direction; a plurality of second gate lines extending in a second direction intersecting the first direction; a line contact portion in which each of the plurality of first gate lines and each of the plurality of second gate lines are in contact with each other; non-contact portion insulated from each other in an intersection area of the plurality of first gate lines and the plurality of second gate lines; a first pixel including a first switching element connected to a corresponding second gate line among the plurality of second gate lines and disposed adjacent to the line contact portion; a second pixel including a second switching element connected to the second gate line connected to the first pixel and disposed adjacent to the non-contact portions; and a third pixel including a third switching element connected to the second gate line connected to the first pixel and the second pixel and disposed between the first switching element and the second switching element, wherein magnitudes of first capacitances between gate electrodes and first electrodes of each of the first to third switching elements are different from each other.

The magnitude of the first capacitance of the third switching element may be greater than the magnitude of the first capacitance of the first switching element, and the magnitude of the first capacitance of the second switching element may be greater than the magnitude of the first capacitance of the third switching element.

The first electrode of the first switching element may be connected to a first pixel electrode of the first switching element, the first electrode of the second switching element may be connected to a second pixel electrode of the second switching element, and the first electrode of the third switching element may be connected to a third pixel electrode of the third switching element, and a size of an overlapping area of the gate electrode and the first electrode of the third switching element may be greater than a size of an overlapping area of the gate electrode and the first electrode of the first switching element, and a size of an overlapping area of the gate electrode and the first electrode of the second switching element may be greater than a size of an overlapping area of the gate electrode and the first electrode of the third switching element.

A size of the gate electrode of the third switching element may be greater than a size of the gate electrode of the first switching element, and a size of the gate electrode of the second switching element may be greater than a size of the gate electrode of the third switching element.

A size of an active region of the third switching element may be greater than a size of an active region of the first switching element, and a size of an active region of the second switching element is greater than a size of an active region of the third switching element.

The first electrode of the first switching element may be connected to a first pixel electrode of the first switching element, the first electrode of the second switching element may be connected to a second pixel electrode of the second switching element, and the first electrode of the third switching element may be connected to a third pixel electrode of the third switching element, and wherein a size of the first electrode of the third switching element may be greater than a size of the first electrode of the first switching element, and a size of the first electrode of the second switching element may be greater than a size of the first electrode of the third switching element.

According to an embodiment of the present disclosure, a display device comprises: a substrate having a display area and a non-display area and including a gate pad unit and a data pad unit disposed at one side of the non-display area, a flexible film connected to the gate pad unit and the data pad unit, and a display driving circuit disposed on the flexible film. The substrate comprises: a plurality of data lines extending in the display area in a first direction, a plurality of first gate lines arranged in parallel to the plurality of data lines, and a plurality of second gate lines intersecting the plurality of first gate lines. The display driving circuit comprises: a data driver connected to the data pad unit to supply a data voltage to the plurality of data lines, and a gate driver connected to the gad pad unit to supply a gate signal to the plurality of first gate lines.

The substrate may comprise: line contact portions in which each of the plurality of first gate lines contacts each of the plurality of second gate lines, non-contact portions insulated from each other at intersections of the plurality of first gate lines and the plurality of second gate lines, a plurality of first pixels including a first switching element connected to the corresponding second gate line of the plurality of second gate lines and disposed adjacent to the line contact portions, a plurality of second pixels including a second switching element connected to the second gate line connected to the first pixel and disposed adjacent to the non-contact portions, and a plurality of third pixels including a third switching element connected to the second gate line connected to the first switching element and the second switching element and disposed between the first switching element and the second switching element.

The plurality of third pixels comprise: a third-first pixel connected to a first data line of the plurality of data lines and a second-first gate line of the plurality of second gate lines, a third-second pixel disposed under the third-first pixel and connected to a second data line of the plurality of data lines and the second-first gate line, a third-third pixel disposed under the third-second pixel and connected to the second data line and a second-second gate line of the plurality of second gate lines, and a third-fourth pixel disposed under the third-third pixel and connected to the first data line and the second-second gate line.

According to an embodiment of the present disclosure, a method of inspecting a display device comprises: applying a data test voltage to a data test pad unit disposed on a second substrate and supplying the data test voltage to a data pad unit connected to the data test pad unit and disposed at one side of a first substrate, and applying a gate test signal to a gate test pad unit disposed on the second substrate and supplying the gate test signal to a gate pad unit connected to the gate test pad unit and disposed at ones of the first substrate.

The supplying of the data test voltage may comprise: allowing the data test pad unit to supply a data test voltage to a first fan-out line, allowing the first fan-out line to supply the data test voltage to a data connection line intersecting the first fan-out line, allowing the data connection line to supply the data test voltage to a second fan-out line extending from the first fan-out line, and allowing the second fan-out line to supply the data test voltage to the data pad unit.

The supplying of the gate test signal may comprise: allowing the gate test pad unit to supply a gate test signal to a first fan-out line, allowing the first fan-out line to supply the gate test signal to a gate connection line intersecting the first fan-out line, allowing the gate connection line to supply the gate test signal to a second fan-out line extending from the first fan-out line, and allowing the second fan-out line to supply the gate test signal to the gate pad unit.

The supplying of the gate test signal may further comprises: allowing the first fan-out line to supply the gate test signal to a gate contact line parallel to the gate connection line.

According to an embodiment of the present disclosure, a method of inspecting a display device comprises: supplying a data voltage to a data pad unit disposed at one side of a substrate, allowing the data pad unit to supply the data voltage to a plurality of data lines extending in a first direction, supplying a gate signal to a gate pad unit disposed at one side of the substrate, allowing the gate pad unit to supply the gate signal to a plurality of first gate lines parallel to the plurality of data lines, and allowing each of the plurality of first gate lines to supply the gate signal to each of a plurality of second gate lines intersecting the plurality of first gate lines.

The supplying of the data voltage to the data pad unit may comprise: allowing a data driver to supply the data voltage to the data pad unit through a lead line of a flexible film, the data driver being disposed on the flexible film attached to one side of the substrate.

The supplying of the gate signal to the gate pad unit may comprises: allowing a gate driver to supply the gate signal to the gate pad unit through the lead line of the flexible film, the gate driver being disposed on the flexible film.

According to the display device of embodiments, the display device may compensate for a difference between a capacitance between a vertical gate line supplying a gate-on voltage and a first pixel electrode and a capacitance between a vertical gate line supplying a gate-off voltage and a second pixel electrode using a difference between a gate-source capacitance of a first pixel and a gate-source capacitance of a second pixel, thereby minimizing a difference in kick-back voltage of a plurality of pixels and preventing spots caused by luminance variations of the plurality of pixels.

Further, according to the display device of embodiments, the display device may compensate for a difference in kick-back voltage between a plurality of vertical gate lines and first to third pixel electrodes using a difference in gate-source capacitance of first to third pixels, thereby minimizing a difference in kick-back voltage between the first to third pixels and removing luminance variations of the plurality of pixels.

Further, according to the method of inspecting a display device according to embodiments, lighting inspection may be performed by using a data pad unit and a gate driver disposed at one side of a substrate, thereby reducing the non-display area of a display device, improving the reliability of a display device, and reducing the cost for light inspection.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
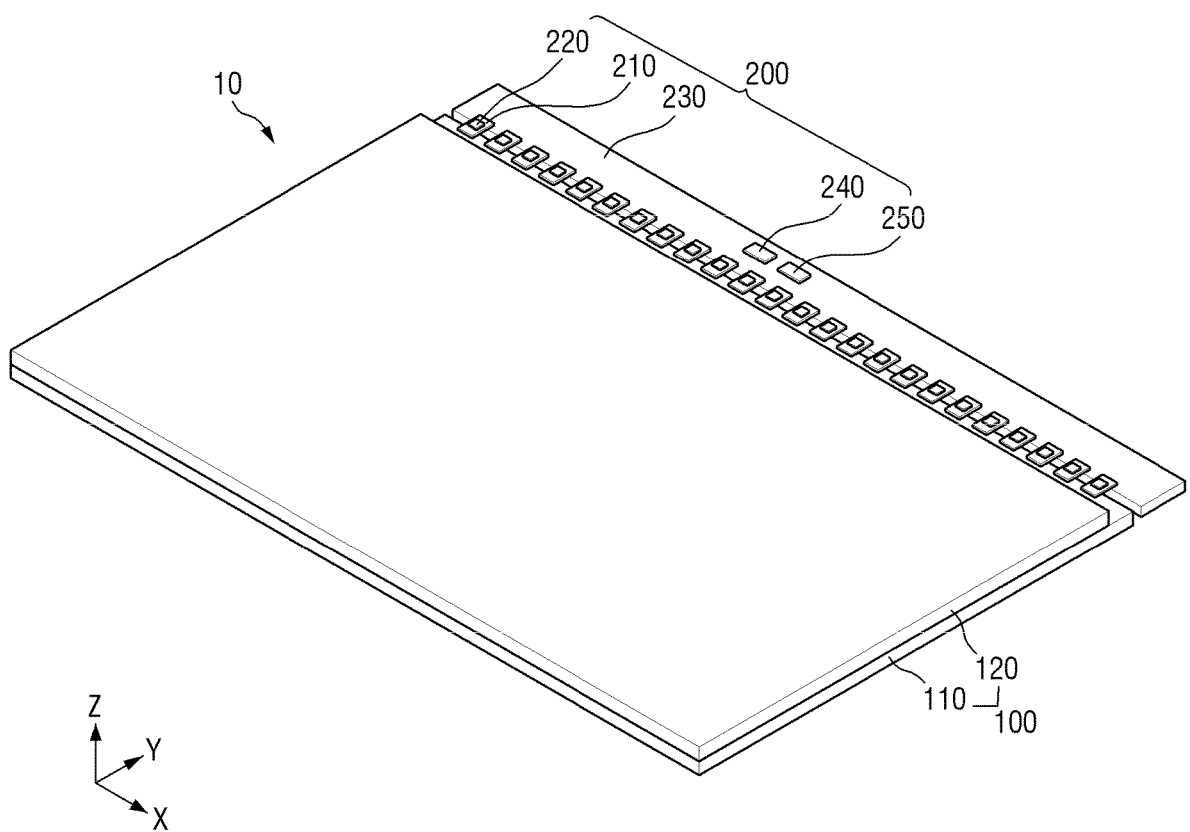
FIG. 1 is a perspective view of a display device according to an embodiment.

Features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

Exemplary embodiments of the present disclosure will hereinafter be described with reference to the accompanying drawings.

Hereinafter, embodiments of the present disclosure will be described with reference to the attached drawings.

Figure 2:
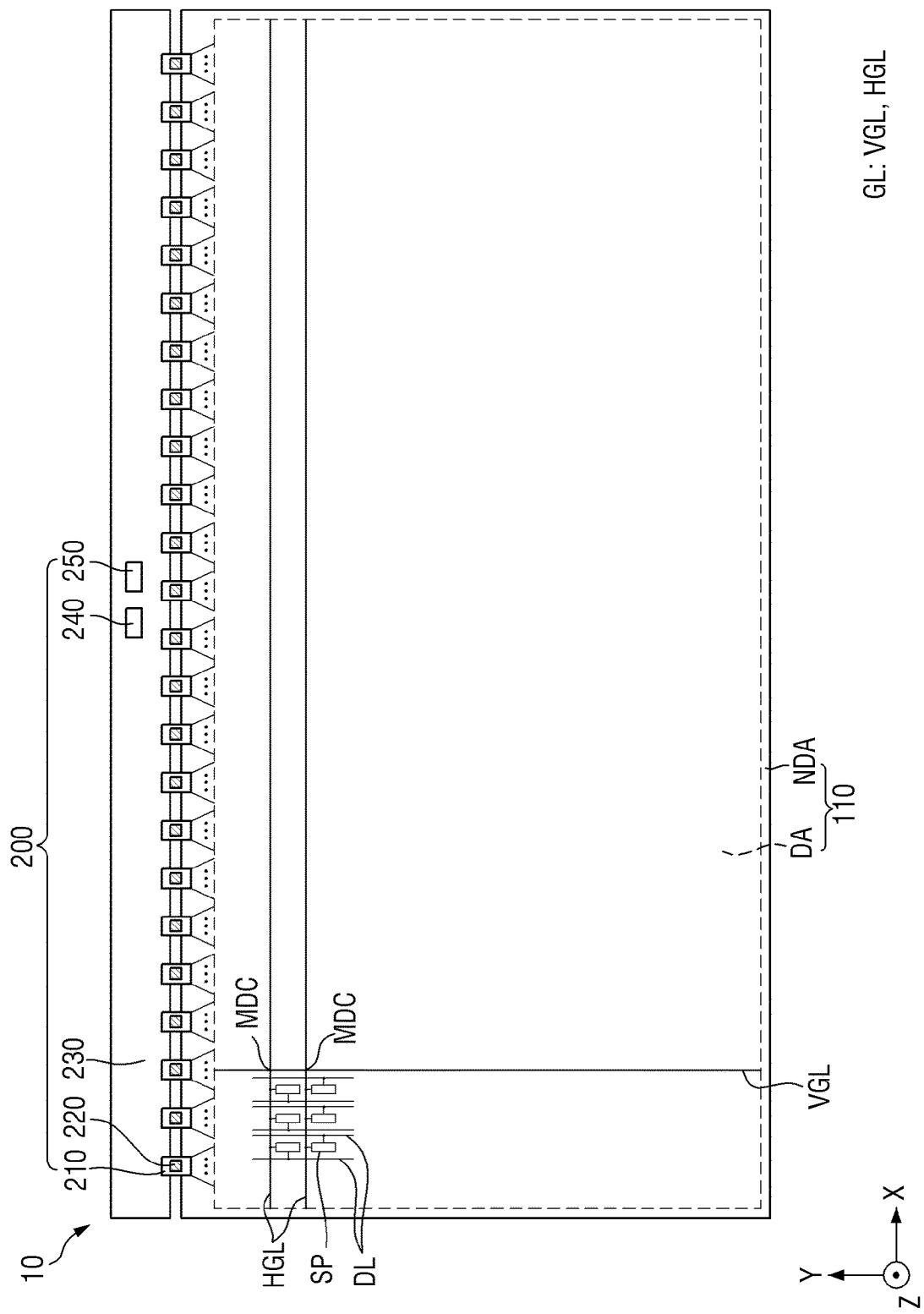
FIG. 2 is a plan view of a display device according to an embodiment.

FIG. 1 is a perspective view of a display device according to an embodiment, and FIG. 2 is a plan view of a display device according to an embodiment.

In this specification, the "on", "over", "top", "upper side", or "upper surface" refers to an upward direction with respect to the display device, that is, a Z-axis direction, 10, and the "beneath", "under", "bottom", "lower side", or "lower surface" refers to a downward direction with respect to the display device 10, that is, a direction opposite to the Z-axis direction. Further, the "left", "right", "upper", and "lower" refer to directions when the display device 10 is viewed from the plane. For example, the "left" refers to a direction opposite to the X-axis direction, the "right" refers to the X-axis direction, the "upper" refers to the Z-axis direction, and the "lower" refers to a direction opposite to the Z-axis direction.

Referring to FIGS. 1 and 2, the display device, which is a device for displaying a moving image or a still image, may be used as a display screen of various products such as televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs).

A display device 10 may include a display panel 100 and a display driver 200.

The display panel 100 may have a rectangular shape in a plan view. For example, the display panel 100 may have a rectangular planar shape having short sides in the first direction (X-axis direction) and long sides in the second direction (Y-axis direction). The corner where the short side in the first direction (X-axis direction) meets the long side in the second direction (Y-axis direction) may be formed to have a right angle shape or a round shape having a predetermined curvature. The planar shape of the display panel 100 is not limited to a rectangular shape, and may be formed in any polygonal shape, circular shape, or elliptical shape. For example, the display panel 100 may be formed to be flat, but is not limited thereto. As another example, the display panel 100 may be formed to be bent at a predetermined curvature.

The display panel 100 may include a first substrate 110 and a second substrate 120. The first substrate 110 and the second substrate 120 may face each other along a thickness direction (Z-axis direction). The first substrate 110 and the second substrate 120 may be made of glass or plastic. For example, the display panel 100 may be implemented as a liquid crystal display panel including a liquid crystal layer disposed between the first substrate 110 and the second substrate 120.

The length of the first substrate 110 in the second direction (Y-axis direction) may be longer than the length of the second substrate 120 in the second direction (Y-axis direction). For example, a part of the upper surface of the first substrate 110 may be exposed without being covered by the second substrate 120. The exposed upper surface of the first substrate 110 may include a pad unit (not shown) to which the display driver 200 is connected.

As depicted in FIG. 2, the first substrate 110 may include a display area DA and a non-display area NDA.

The display area DA, which is an area for displaying an image, may be defined as a central area of the first substrate 110. The display area DA may include a plurality of pixels SP formed for each pixel area intersected by a plurality of data lines DL and a plurality of gate lines GL. The plurality of gate lines GL may include a plurality of first gate lines VGL and a plurality of second gate lines HGL. For example, the plurality of first gate lines may be a plurality of vertical gate lines VGL connected to a display driving circuit 220 and extending in the second direction (Y-axis direction), and the plurality of second gate lines may be a plurality of horizontal gate lines HGL connected to any one of the plurality of vertical gate lines VGL and extending in the first direction (X-axis direction). Each of the plurality of pixels SP may be connected to at least one horizontal gate line HGL and at least one data line DL. Each of the plurality of pixels SP may be defined as an area of a minimum unit for outputting light.

The plurality of data lines DL may extend in the second direction (Y-axis direction), and may be spaced apart from each other in the first direction (X-axis direction). For example, the plurality of pixels SP arranged along one column may receive data voltages through two data lines DL. Among the plurality of pixels SP, the pixels SP arranged in some rows may receive a data voltage from the data line DL disposed at the left side, and the pixels SP arranged in other rows may receive a data voltage from the data line DL disposed at the right side.

The plurality of vertical gate lines VGL may extend in the second direction (Y-axis direction), and may be spaced apart from each other in the first direction (X-axis direction). The plurality of vertical gate lines VGL may be arranged in parallel with the plurality of data lines DL. The plurality of horizontal gate lines HGL may extend in the first direction (X-axis direction), and may be spaced apart from each other in the second direction (Y-axis direction). Each of the plurality of horizontal gate lines HGL may intersect the plurality of vertical gate lines VGL. For example, one vertical gate line VGL may be connected to two horizontal gate lines HGL. Each of the one vertical gate line VGL and the two horizontal gate lines HGL may be connected through line contact portions MDC. Each of the line contact portions MDC may correspond to a portion where a gate insulating film is omitted in an overlapping region of the vertical gate line VGL and the horizontal gate line HGL.

For example, one vertical gate line VGL may be connected to two horizontal gate lines HGL. In this case, among the plurality of pixels SP, the pixels SP arranged in some rows may receive a data voltage from the data line DL disposed at the left side, and the pixels SP arranged in other rows may receive a data voltage from the data line DL disposed at the right side. As another example, one vertical gate line VGL may be connected to one horizontal gate line HGL. In this case, each of the plurality of pixels SP may receive a data voltage from the data line DL disposed at one side. Therefore, a connection relationship among the plurality of data lines DL, the plurality of vertical gate lines VGL, the plurality of horizontal gate lines HGL, and the plurality of pixels SP is not limited to the connection relationship shown in FIG. 2. The connection relationship among the plurality of data lines DL, the plurality of vertical gate lines VGL, the plurality of horizontal gate lines HGL, and the plurality of pixels SP may be varied depending on the number and arrangement of the plurality of pixels SP.

The non-display area NDA may be defined in the remaining area of the first substrate 110 other than the display area DA. For example, the non-display area NDA may include fan-out lines connecting the data lines DL or the vertical gate lines VGL with the display driving circuit 220, and a pad unit connected to a flexible film 210.

The display driver 200 may be connected to the pad unit provided in the non-display area NDA of the first substrate 110 to display an image on the plurality of pixels SP based on image data supplied from a display driving system (not shown). The display driver 200 may include a flexible film 210, a display driving circuit 220, a circuit board 230, a timing controller 240, and a power supply unit 250.

Input terminals provided at one end of the flexible film 210 may be fixedly attached to the circuit board 230 by a film attaching process, and output terminals provided at the other end of the flexible film 210 may be fixedly attached to the pad unit by a film attaching process. For example, the flexible film 210 may be a flexible film such as a tape carrier package or a chip on film, which may be bent. The flexible film 210 may be bent toward the lower portion of the first substrate 110 to reduce the bezel area of the display device.

The display driving circuit 220 may be mounted on the flexible film 210. For example, the display driving circuit 220 may be implemented as an integrated circuit (IC). The display driving circuit 220 may receive digital video data and a data control signal from the timing controller 240, convert the digital video data into analog positive/negative data voltages according to the data control signal, and transmit the analog positive/negative data voltages to the data lines DL through the fan-out lines. Further, the display driving circuit 220 may generate gate signals according to a gate control signal supplied from the timing controller 240, and may sequentially supply the gate signals to the plurality of vertical gate lines VGL in a set order.

The circuit board 230 may support the timing controller 240 and the power supply unit 250, and may transmit signals and power between the components of the display driver 200. For example, the circuit board 230 may supply a signal supplied from the timing controller 240 and driving power supplied from the power supply unit 250 to the display driving circuit 220 to display an image on each pixel. For this purpose, a signal transmission line and a plurality of power lines may be provided on the circuit board 230.

The timing controller 240 may be mounted on the circuit board 230 and receive image data and a timing synchronization signal supplied from a display driving system through a user connector provided on the circuit board 230. The timing controller 240 may generate digital video data by aligning the image data according to the pixel arrangement structure on the basis of the timing synchronization signal, and may supply the generated digital video data to the corresponding display driving circuit 220. The timing controller 240 may generate a data control signal and a gate control signal based on the timing synchronization signal. The timing controller 240 may control the data voltage supply timing of the display driving circuit 220 based on the data control signal, and may control the gate signal supply timing of the display driving circuit 220 based on the gate control signal.

The power supply unit 250 may be disposed on the circuit board 230 to supply driving voltages to the display driving circuit 220 and the display panel 100. For example, the power supply unit 250 may generate a first driving voltage and supply the first driving voltage to each of the plurality of pixels SP arranged on the first substrate 110, and may generate a second driving voltage and supply the second driving voltage to a common electrode disposed on the second substrate 120. The first driving voltage may correspond to a high potential voltage for driving the plurality of pixels SP, and the second driving voltage may correspond to a common voltage commonly supplied to the plurality of pixels SP.

For example, the display device may further include a sealing member (not shown) disposed between the first substrate 110 and the second substrate 120. The sealing member may surround a liquid crystal layer formed between the first substrate 110 and the second substrate 120. The sealing member may be provided around the edge of the display area DA to attach the first substrate 110 and the second substrate 120 to each other. The sealing member may seal the liquid crystal layer to prevent the liquid crystal layer from being exposed to the outside of the display area DA.

Figure 3:
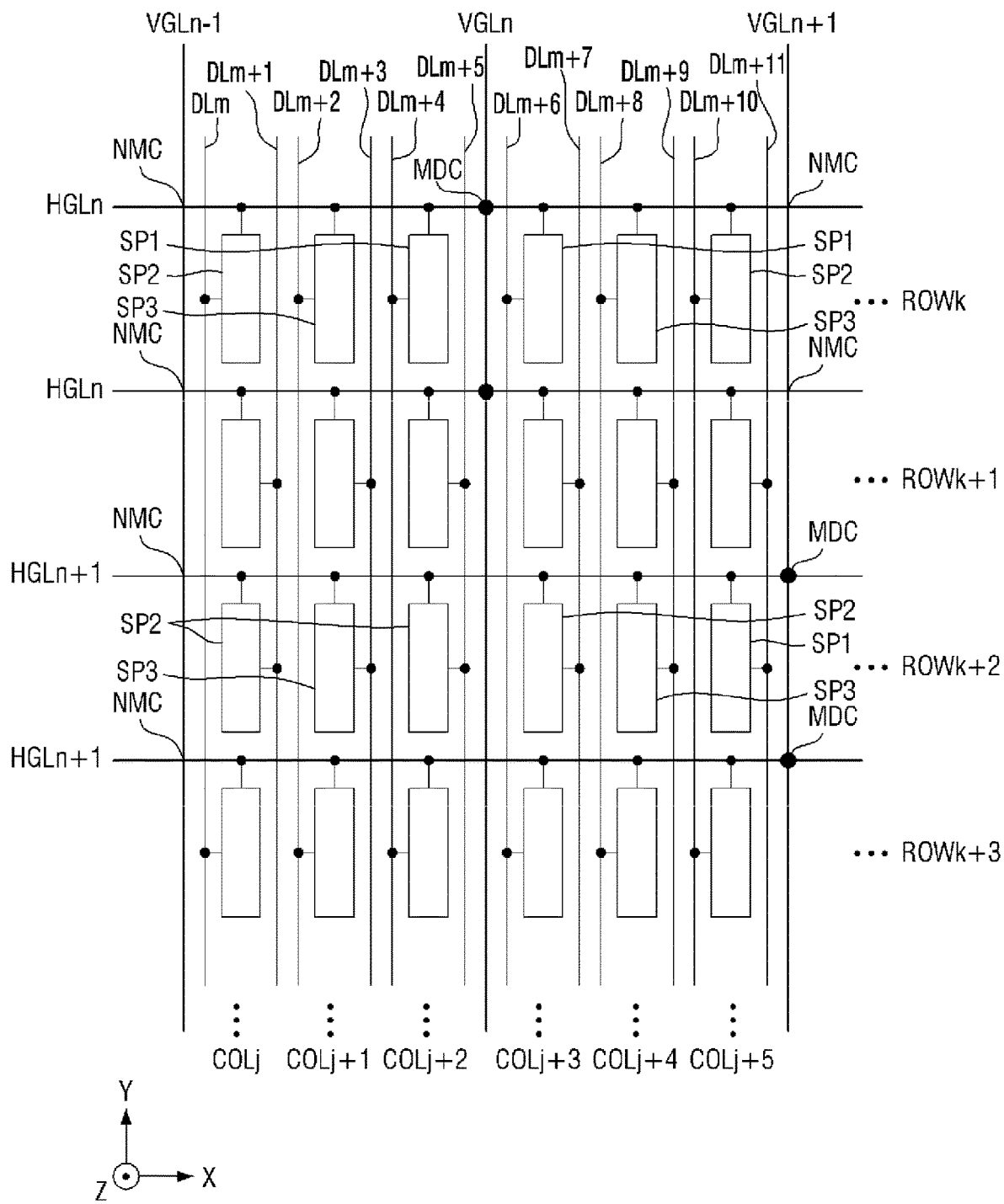
FIG. 3 is showing a connection relation between a plurality of pixels and a plurality of gate lines in the display device according to an embodiment.

FIG. 3 is showing a connection relation between a plurality of pixels and a plurality of gate lines in the display device according to an embodiment.

Referring to FIG. 3, the plurality of pixels SP may include first to third pixels SP1, SP2, and SP3. Each of the first to third pixels SP1, SP2, and SP3 may be connected to at least one data line DL and at least one horizontal gate line HGL.

The data lines from DLm to DLm+11 (hereinafter, m is a natural number) may extend in the second direction (Y-axis direction), and may be spaced apart from each other in the first direction (X-axis direction). The plurality of pixels SP arranged along one column may receive data voltages through two data lines DL. For example, the pixels SP arranged in the column COLj (hereinafter, j is a natural number) may receive data voltages from the data lines DLm and DLm+1. Further, among the plurality of pixels SP, the pixels SP arranged in the rows ROWk and ROWk+3 (hereinafter, k is a natural number) may receive data voltages from data lines DLm, DLm+2, . . . , and DLm+10 arranged at the left side. Among the plurality of pixels SP, the pixels SP arranged in the rows ROWk+1 and ROWk+2 may receive data voltages from data lines DLm+1, DLm+3, . . . , and DLm+11 arranged at the right side. Since the nth horizontal gate line HGLn may simultaneously supply gate-on voltages to the pixels SP arranged in the kth row ROWk and the pixels SP arranged in the k+1th row ROWk+1, the pixels SP disposed in the kth row ROWk may receive data voltages from the data lines DL disposed at the left side, and the pixels SP arranged in the k+1th row ROWk+1 may receive data voltages from the data lines DL disposed at the right side so that each of the plurality of pixels SP may independently express gradation.

The plurality of vertical gate lines VGL may be arranged in parallel with the plurality of data lines DL. Each of the plurality of horizontal gate lines HGL may cross each of the plurality of vertical gate lines VGL. In this case, each of the plurality of horizontal gate lines HGL may be substantially perpendicular to each of the plurality of vertical gate lines VGL. One vertical gate line VGL may be connected to two horizontal gate lines HGL. For example, the nth vertical gate line VGL may be connected to two nth horizontal gate lines HGLn arranged along each of the kth row ROWk and the k+1th row ROWk+1. The nth vertical gate line VGL may be connected to the nth horizontal gate line HGLn through the line contact portions MDC. The nth vertical gate line VGL may be insulated from other horizontal gate lines except for the nth horizontal gate line HGLn among the plurality of horizontal gate lines HGL in non-contact portions NMC. The non-contact portions NMC may correspond to portions that are insulated from each other at the intersection of the vertical gate line VGL and the horizontal gate line HGL. The nth vertical gate line VGL may be insulated from the n+1th horizontal gate line HGLn+1 and the non-contact portion NMC.

The first pixel SP1 may include a first switching element connected to the corresponding horizontal gate line HGL among the plurality of horizontal gate lines HGL and disposed adjacent to the line contact portion MDC. The first pixel SP1 may be disposed in a pixel area where the nth vertical gate line VGLn intersects the nth horizontal gate line HGLn (hereinafter, n is a natural number of 2 or more). For example, when the first pixel SP1 receives a gate-on voltage from the nth horizontal gate line HGLn, the nth vertical gate line VGLn adjacent to the first pixel SP1 may supply a gate-on voltage to the nth horizontal gate line HGLn. Further, the first pixel SP1 may be disposed in a pixel area where the n+1th vertical gate line VGLn+1 intersects the n+1th horizontal gate line HGLn+1. When the first pixel SP1 receives a gate-on voltage from the n+1th horizontal gate line HGLn+1, the n+1 vertical gate line VGLn+1 adjacent to the first pixel SP1 may supply a gate-on voltage to the n+1 horizontal gate line HGLn+1. In this case, the first capacitance of the first pixel SP1 may be formed between the gate electrode and source electrode of the first switching element, and the second capacitance of the first pixel SP1 may be formed between the first pixel electrode and the vertical gate line VGL supplying the gate-on voltage.

The second pixel SP2 may include a second switching element connected to the horizontal gate line HGL to which the first pixel SP1 is connected and adjacent to the non-contact portion NMC. The second pixel SP2 may be disposed in a pixel area where the vertical gate line VGL and the horizontal gate line HGL, which are insulated from each other, intersect each other. The second pixel SP2 may be disposed in a pixel area where the nth horizontal gate line HGLn intersects the n−1th vertical gate line VGLn−1. For example, when the second pixel SP2 receives a gate-on voltage from the nth horizontal gate line HGLn, the n−1th vertical gate line VGLn−1 adjacent to the second pixel SP2 may have a gate off voltage. Further, the second pixel SP2 may be disposed in a pixel area where the n+1th horizontal gate line HGLn+1 intersects the nth vertical gate line VGLn. When the second pixel SP2 receives a gate on voltage from the n+1th horizontal gate line HGLn+1, the nth vertical gate line VGLn adjacent to the second pixel SP2 may have a gate-off voltage. In this case, the first capacitance of the second pixel SP2 may be formed between the gate electrode and source electrode of the second switching element, and the second capacitance of the second pixel SP2 may be formed between the second pixel electrode and the vertical gate line VGL having the gate-off voltage.

For example, the second capacitance between the first pixel electrode of the first pixel SP1 and the vertical gate line VGL supplying the gate on voltage may be different from the second capacitance between the second pixel electrode of the second pixel SP2 and the vertical gate line VGL having the gate-off voltage. Accordingly, the display device may adjust the first capacitance between the gate electrode and source electrode of the first switching element of the first pixel SP1 and the first capacitance between the gate electrode and source electrode of the second switching element of the second pixel SP2, thereby compensating for a difference between the second capacitance of the first pixel SP1 and the second capacitance of the second pixel SP2. The display device may compensate for a difference between the second capacitance of the first pixel SP1 and the second capacitance of the second pixel SP2, thereby minimizing a difference in kick-back voltage between the plurality of pixels SP and preventing spots caused by luminance variations of the plurality of pixels SP.

The third pixel SP3 may be disposed between the first pixel SP1 and the second pixel SP2 or may be disposed between the second pixels SP2. For example, the third pixel SP3 may be disposed between the first pixel SP1 disposed in the pixel area where the nth vertical gate line VGLn intersect the nth horizontal gate line HGLn, and the second pixel SP2 disposed in the pixel area where the n−1th vertical gate line VGLn−1 intersects the nth horizontal gate line HGLn. That is, the third pixel SP3 disposed in the kth row ROWk and the j+1th column COLj+1 may be disposed between the first pixel SP1 disposed in the kth row ROWk and the j+2th column COLj+2 and the second pixel SP2 disposed in kth row ROWk and jth column COLj.

Further, the third pixel SP3 may be disposed between the second pixel SP2 disposed in the pixel area where the nth vertical gate line VGLn intersect the n+1th horizontal gate line HGLn+1, and the second pixel SP2 disposed in the pixel area where the n−1th vertical gate line VGLn−1 intersects the n+1th horizontal gate line HGLn+1. That is, the third pixel SP3 disposed in the k+2th row ROWk+2 and the j+1th column COLj+1 may be disposed between the second pixel SP2 disposed in the k+2th row ROWk+2 and the j+2th column COLj+2 and the second pixel SP2 disposed in k+2th row ROWk+2 and jth column COLj. Therefore, for both cases, the third pixel SP3 may be closer to the first pixel SP1 (in kth column ROWk) or the second pixel SP2 (in k+2th column ROWk+2) than the plurality of vertical gate lines VGL. Since the third pixel SP3 does not have a directly adjacent vertical gate line VGL, the third pixel SP3 may be less affected by the second capacitance than the first pixel SP1 or the second pixel SP2.

For example, the first pixel SP1 may have a second capacitance between the first pixel electrode and the vertical gate line VGL supplying a gate-on voltage, the second pixel SP2 may have a second capacitance between the second pixel electrode and the vertical gate line VGL having a gate off voltage, and the third pixel SP3 may be less affected by the second capacitance than the first pixel SP1 or the second pixel SP2. In this case, the first to third pixels SP1, SP2, and SP3 may have different kick-back voltages from another. Therefore, the display device may adjust the first capacitance between the gate electrode and the source electrode of each of the first switching element of the first pixel SP1, the second switching element of the second pixel SP2, and the third switching element of the third pixel SP3, thereby minimizing differences in kick-back voltages of the first to third pixels SP1, SP2, and SP3. The display device may compensate for the differences in kick-back voltages of the first to third pixels SP1, SP2, and SP3, thereby preventing spots caused by luminance variations of the plurality of pixels SP.

Figure 4:
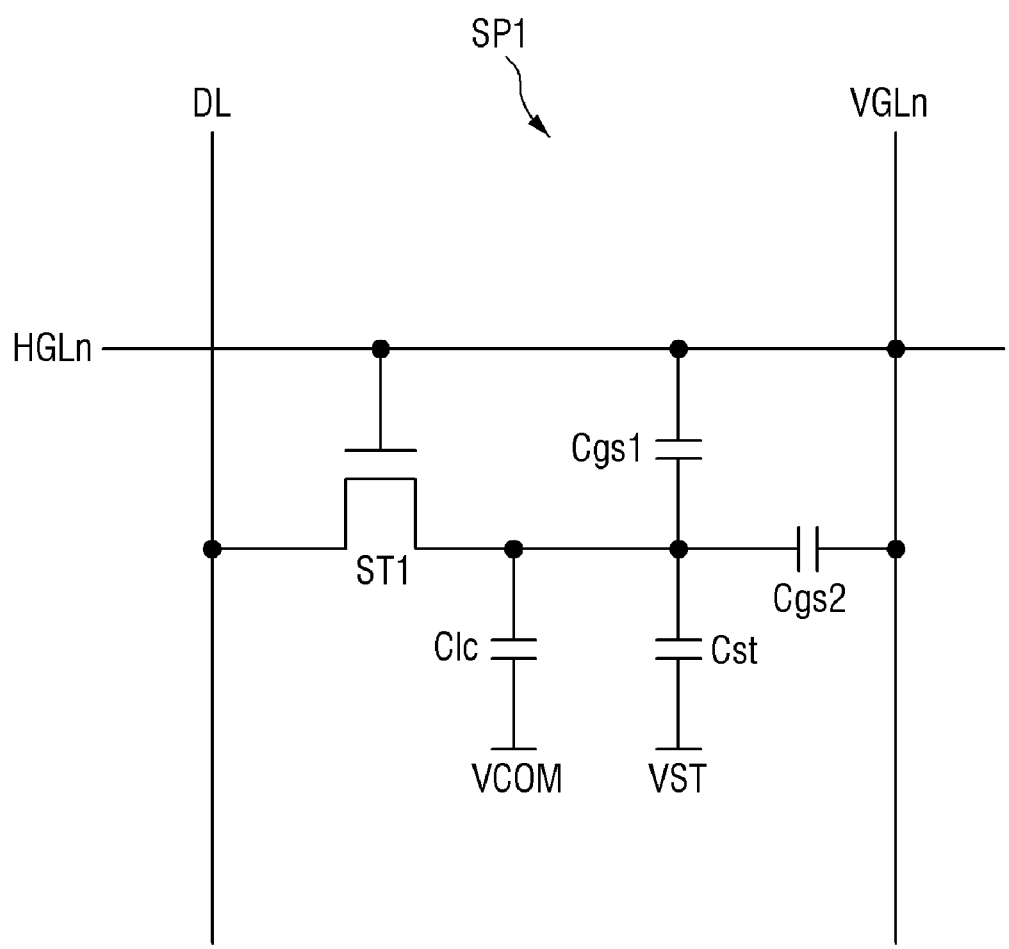
FIG. 4 is a circuit diagram showing a pixel circuit of a first pixel in the display device according to an embodiment.

FIG. 4 is a circuit diagram showing a pixel circuit of a first pixel in the display device according to an embodiment.

Referring to FIG. 4, the pixel circuit of the first pixel SP1 may include a first switching element ST1 and a first pixel electrode. The first pixel SP1 may further include a liquid crystal capacitor Clc formed between the first pixel electrode and the common electrode, a storage capacitor Cst formed between the source electrode and the storage electrode STE of the first switching element ST1, a first capacitor Cgs1 formed between the source electrode and the gate electrode of the first switching element ST1, and a second capacitor Cgs2 formed between the first pixel electrode and the nth vertical gate line VGLn. Hereinafter, the first capacitor Cgs1 may have a first capacitance, and the second capacitor Cgs2 may have a second capacitance.

The first switching element ST1 may be connected to the nth horizontal gate line HGLn and the data line DL. For example, the first switching element ST1 may include a gate electrode connected to the nth horizontal gate line HGLn, a drain electrode DE connected to the data line DL, and a source electrode SE connected to the first pixel electrode. Here, each of the drain electrode DE and the source electrode SE may be referred to as a first electrode or a second electrode of the switching element.

The first switching element ST1 may be turned on based on a gate signal to supply a data voltage to the first pixel electrode.

One end of the liquid crystal capacitor Clc may be formed of the first pixel electrode, and the other end of the liquid crystal capacitor Clc may be formed of the common electrode on the second substrate. The first pixel electrode may receive a data voltage, and the common electrode may receive a common voltage VCOM. The liquid crystal capacitor Clc may charge a voltage between the first pixel electrode and the common electrode. The liquid crystal layer may be disposed between the first pixel electrode and the common electrode, and the arrangement of liquid crystal molecules in the liquid crystal layer may be changed depending on a voltage difference between the first pixel electrode and the common electrode, thereby changing the transmittance of light passing through the liquid crystal layer.

One end of the storage capacitor Cst may be formed of the source electrode of the first switching element ST1, and the other end of the storage capacitor Cst may be formed of the storage electrode. When the first switching element ST1 is turned on, the source electrode of the first switching element ST1 may receive a data voltage, and the storage electrode may receive a storage voltage VST. For example, the storage electrode may be grounded, but the present disclosure is not necessarily limited thereto. The storage capacitor Cst may charge a voltage between the source electrode and the storage electrode of the first switching element ST1.

For example, when the nth horizontal gate line HGLn supplies a gate-on voltage, the first switching element ST1 may be turned on, and the data line DL may supply a data voltage to the first pixel electrode. The storage capacitor Cst may charge a data voltage and supply the charged data voltage to the liquid crystal capacitor Clc for one frame period. Accordingly, the liquid crystal capacitor Clc may maintain a constant potential difference by the storage capacitor Cst, and the liquid crystal layer may maintain a constant arrangement of liquid crystal molecules to transmit light.

One end of the first capacitor Cgs1 may be formed of the gate electrode of the first switching element ST1, and the other end of the first capacitor Cgs1 may be formed of the source electrode of the first switching element ST1. For example, one end of the first capacitor Cgs1 may correspond to a part of the nth horizontal gate line HGLn, and the other end of the first capacitor Cgs1 may be the source electrode of the switching element ST1 overlapping the nth horizontal gate line HGLn. Therefore, the first capacitance may be formed between the gate electrode and the source electrode of the first switching element ST1.

One end of the second capacitor Cgs2 may be formed of the first pixel electrode, and the other end of the second capacitor Cgs2 may be formed of the nth vertical gate line VGLn. For example, when the first pixel SP1 is disposed in the pixel area where the nth vertical gate line VGLn intersects the nth horizontal gate line HGLn, one end of the second capacitor Cgs2 may be a first pixel electrode receiving a data voltage, and the other end of the second capacitor Cgs2 may be an nth vertical gate line VGLn supplying a gate-on voltage. Thus, the second capacitance may be formed between the first pixel electrode and the nth vertical gate line VGLn.

Figure 5:
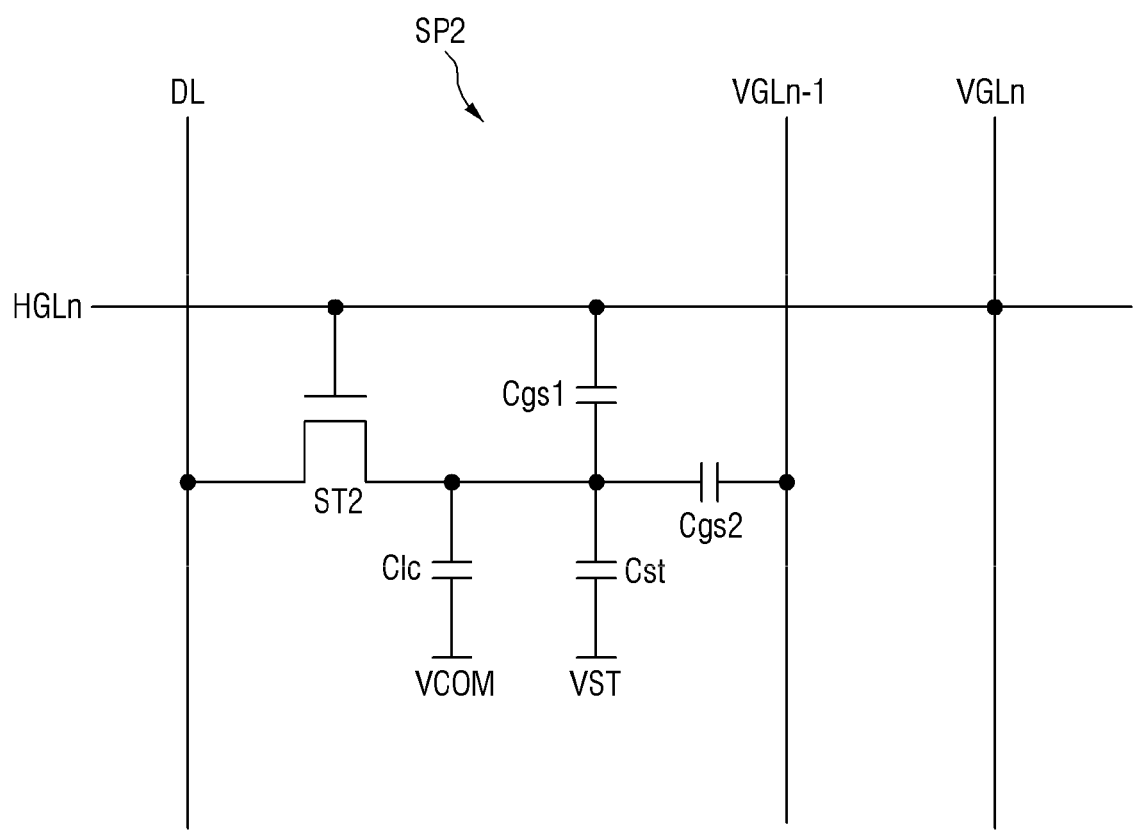
FIG. 5 is a circuit diagram showing a pixel circuit of a second pixel in the display device according to an embodiment.

FIG. 5 is a circuit diagram showing a pixel circuit of a second pixel in the display device according to an embodiment.

Referring to FIG. 5, the pixel circuit of the second pixel SP2 may include a second switching element ST2 and a second pixel electrode. The second pixel SP2 may further include a liquid crystal capacitor Clc formed between the second pixel electrode and the common electrode, a storage capacitor Cst formed between the source electrode and the storage electrode STE of the second switching element ST2, a first capacitor Cgs1 formed between the source electrode and the gate electrode of the second switching element ST2, and a second capacitor Cgs2 formed between the second pixel electrode and the n−1th vertical gate line VGLn−1.

The second switching element ST2 may be connected to the nth horizontal gate line HGLn and the data line DL. For example, the second switching element ST2 may include a gate electrode connected to the nth horizontal gate line HGLn, a drain electrode DE connected to the data line DL, and a source electrode SE connected to the second pixel electrode. The second switching element ST2 may be turned on based on a gate signal to supply a data voltage to the second pixel electrode.

One end of the liquid crystal capacitor Clc may be formed of the second pixel electrode, and the other end of the liquid crystal capacitor Clc may be formed of the common electrode on the second substrate. The second pixel electrode may receive a data voltage, and the common electrode may receive a common voltage VCOM. The liquid crystal capacitor Clc may charge a voltage between the second pixel electrode and the common electrode. The liquid crystal layer may be disposed between the second pixel electrode and the common electrode, and the arrangement of liquid crystal molecules in the liquid crystal layer may be changed depending on a voltage difference between the second pixel electrode and the common electrode, thereby changing the transmittance of light passing through the liquid crystal layer.

One end of the storage capacitor Cst may be formed of the source electrode of the second switching element ST2, and the other end of the storage capacitor Cst may be formed of the storage electrode. When the second switching element ST2 is turned on, the source electrode of the second switching element ST2 may receive a data voltage, and the storage electrode may receive a storage voltage VST. For example, the storage electrode may be grounded, but the present disclosure is not necessarily limited thereto. The storage capacitor Cst may charge a voltage between the source electrode and the storage electrode of the second switching element ST2.

For example, when the nth horizontal gate line HGLn supplies a gate-on voltage, the second switching element ST2 may be turned on, and the data line DL may supply a data voltage to the second pixel electrode. The storage capacitor Cst may charge a data voltage and supply the charged data voltage to the liquid crystal capacitor Clc for one frame period. Accordingly, the liquid crystal capacitor Clc may maintain a constant potential difference by the storage capacitor Cst, and the liquid crystal layer may maintain a constant arrangement of liquid crystal molecules to transmit light.

One end of the first capacitor Cgs1 may be formed of the gate electrode of the second switching element ST2, and the other end of the first capacitor Cgs1 may be formed of the source electrode of the second switching element ST2. For example, one end of the first capacitor Cgs1 may correspond to a part of the nth horizontal gate line HGLn, and the other end of the first capacitor Cgs1 may be the source electrode of the second switching element ST2 overlapping the nth horizontal gate line HGLn. Therefore, the first capacitance may be formed between the gate electrode and the source electrode of the second switching element ST2.

One end of the second capacitor Cgs2 may be formed of the second pixel electrode, and the other end of the second capacitor Cgs2 may be formed of the n−1th vertical gate line VGLn−1. For example, when the second pixel SP2 is disposed in the pixel area where the n−1th vertical gate line VGLn−1 intersects the nth horizontal gate line HGLn, one end of the second capacitor Cgs2 may be a second pixel electrode receiving a data voltage, and the other end of the second capacitor Cgs2 may be an n−1th vertical gate line VGLn−1 supplying a gate-on voltage. Thus, the second capacitance may be formed between the second pixel electrode and the n−1th vertical gate line VGLn−1.

Figure 6:
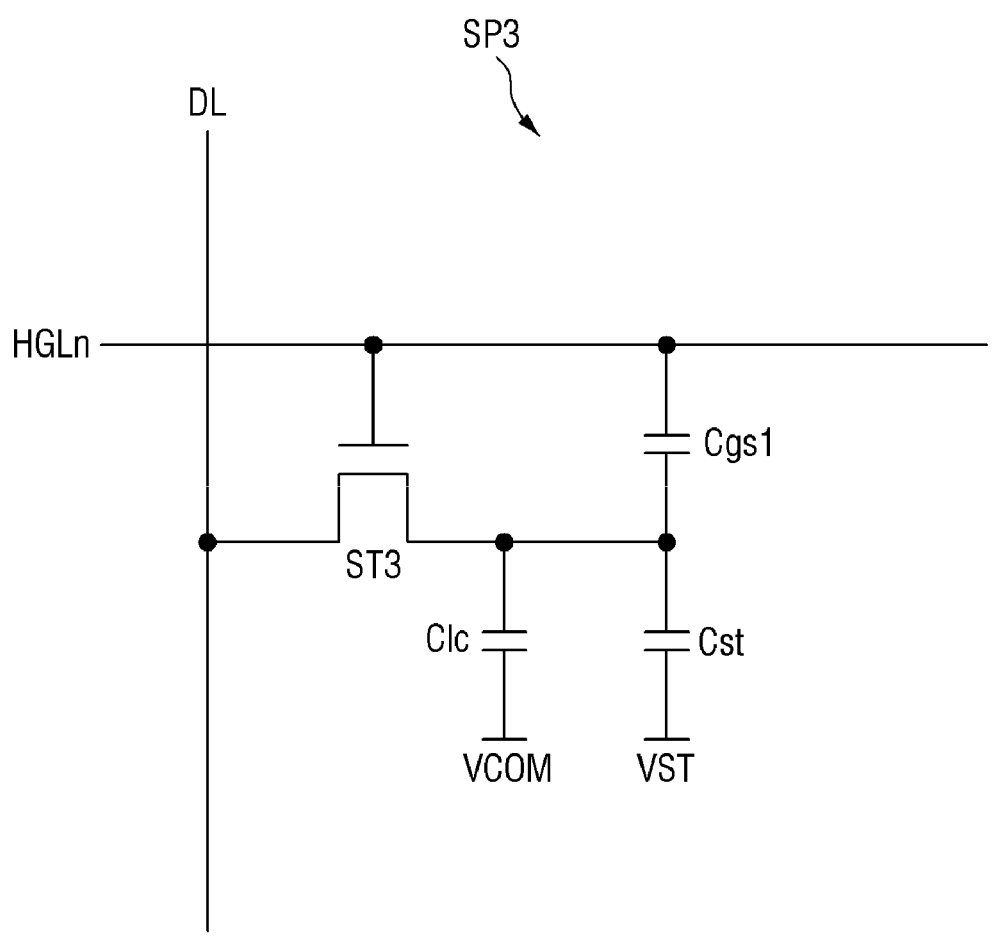
FIG. 6 is a circuit diagram showing a pixel circuit of a third pixel in the display device according to an embodiment.

FIG. 6 is a circuit diagram showing a pixel circuit of a third pixel in the display device according to an embodiment.

Referring to FIG. 6, the pixel circuit of the third pixel SP3 may include a third switching element ST3 and a third pixel electrode. The third switching element ST3 may further include a liquid crystal capacitor Clc formed between the third pixel electrode and the common electrode, a storage capacitor Cst formed between the source electrode and the storage electrode STE of the third switching element ST3, and a first capacitor Cgs1 formed between the source electrode and the gate electrode of the third switching element ST3.

The third switching element ST3 may be connected to the nth horizontal gate line HGLn and the data line DL. For example, the third switching element ST3 may include a gate electrode connected to the nth horizontal gate line HGLn, a drain electrode DE connected to the data line DL, and a source electrode SE connected to the third pixel electrode. The third switching element ST3 may be turned on based on a gate signal to supply a data voltage to the third pixel electrode.

One end of the liquid crystal capacitor Clc may be formed of the third pixel electrode, and the other end of the liquid crystal capacitor Clc may be formed of the common electrode on the second substrate. The third pixel electrode may receive a data voltage, and the common electrode may receive a common voltage VCOM. The liquid crystal capacitor Clc may charge a voltage between the third pixel electrode and the common electrode. The liquid crystal layer may be disposed between the third pixel electrode and the common electrode, and the arrangement of liquid crystal molecules in the liquid crystal layer may be changed depending on a voltage difference between the third pixel electrode and the common electrode, thereby changing the transmittance of light passing through the liquid crystal layer.

One end of the storage capacitor Cst may be formed of the source electrode of the third switching element ST3, and the other end of the storage capacitor Cst may be formed of the storage electrode. When the third switching element ST3 is turned on, the source electrode of the third switching element ST3 may receive a data voltage, and the storage electrode may receive a storage voltage VST. For example, the storage electrode may be grounded, but the present disclosure is not necessarily limited thereto. The storage capacitor Cst may charge a voltage between the source electrode and the storage electrode of the third switching element ST3.

For example, when the nth horizontal gate line HGLn supplies a gate-on voltage, the third switching element ST3 may be turned on, and the data line DL may supply a data voltage to the third pixel electrode. The storage capacitor Cst may charge a data voltage and supply the charged data voltage to the liquid crystal capacitor Clc for one frame period. Accordingly, the liquid crystal capacitor Clc may maintain a constant potential difference by the storage capacitor Cst, and the liquid crystal layer may maintain a constant arrangement of liquid crystal molecules to transmit light.

One end of the first capacitor Cgs1 may be formed of the gate electrode of the third switching element ST3, and the other end of the first capacitor Cgs1 may be formed of the source electrode of the third switching element ST3. For example, one end of the first capacitor Cgs1 may correspond to a part of the nth horizontal gate line HGLn, and the other end of the first capacitor Cgs1 may be the source electrode of the third switching element ST3 overlapping the nth horizontal gate line HGLn. Therefore, the first capacitance may be formed between the gate electrode and the source electrode of the third switching element ST3.

Figure 7:
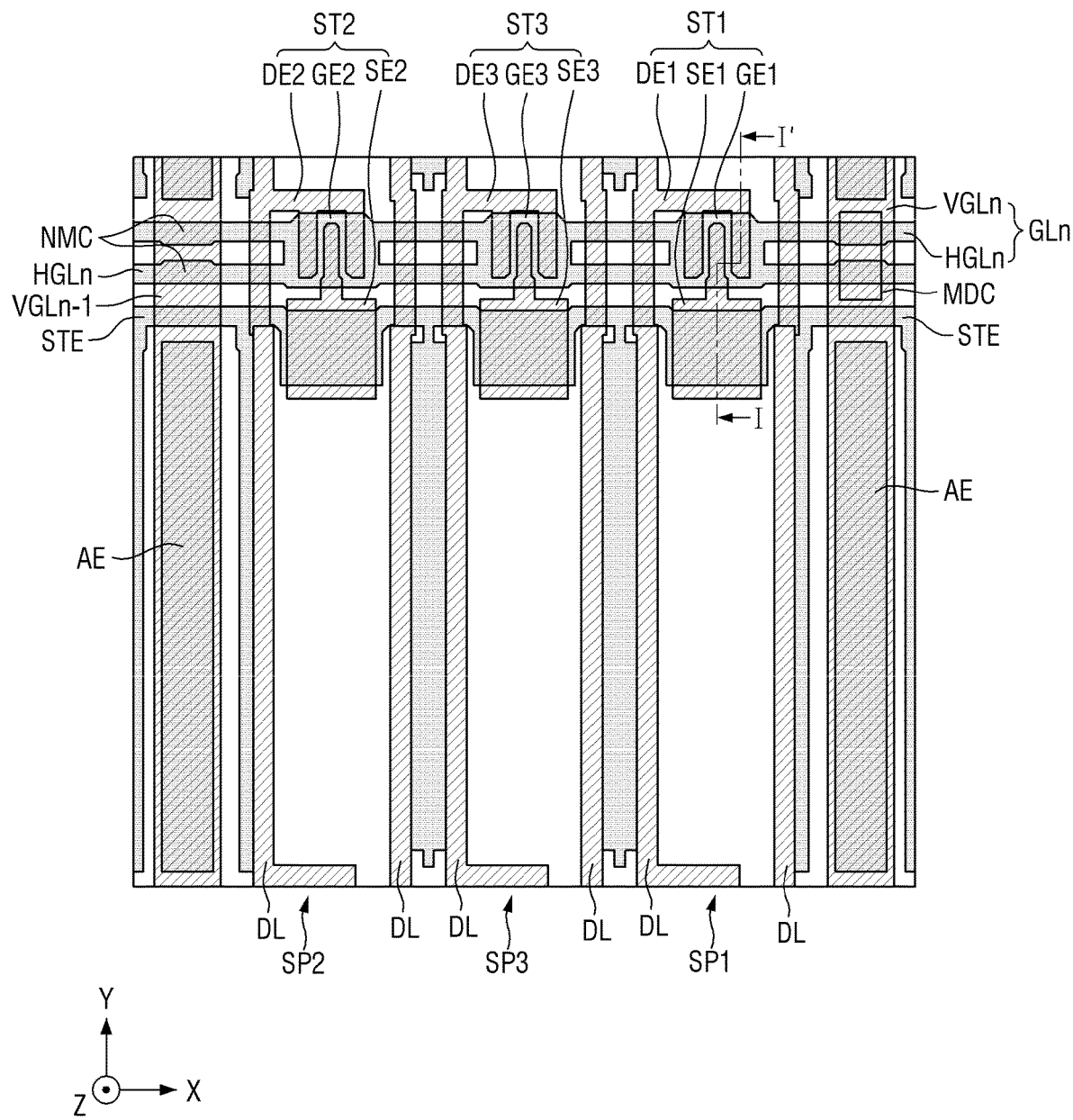
FIG. 7 is a plan view showing first to third pixels in the display device according to an embodiment.
Figure 8:
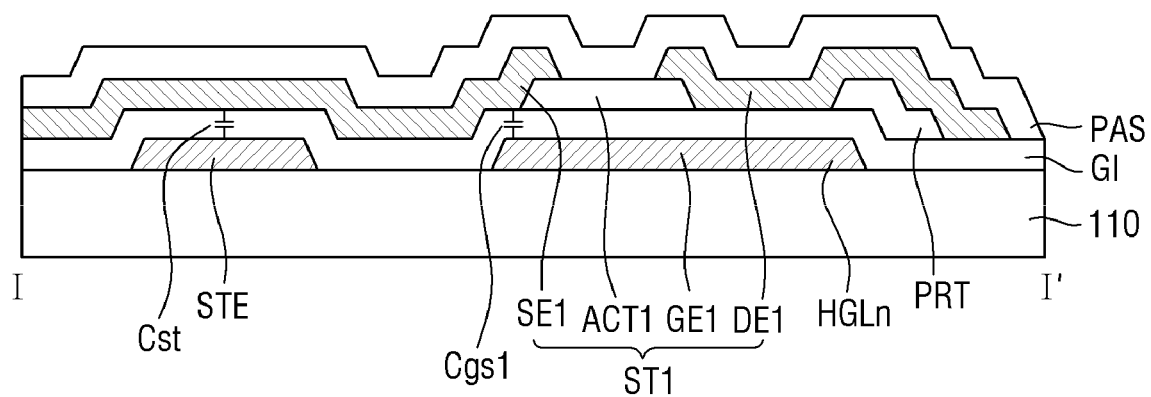
FIG. 8 is a cross-sectional view taken along line I-I' of FIG. 7.

FIG. 7 is a plan view showing first, second, and third pixels in the display device according to an embodiment, and FIG. 8 is a cross-sectional view taken along line I-I' of FIG. 7.

Referring to FIGS. 7 and 8, the display panel 100 includes a first substrate 110, an nth horizontal gate line HGLn, a storage electrode STE, an auxiliary electrode AE, a gate insulating film GI, a plurality of data lines DL, an n−1th vertical gate line VGLn−1, an nth vertical gate line VGLn, a passivation layer PAS, and first, second, and third pixels SP1, SP2, and SP3.

The nth horizontal gate line HGLn may be disposed on the first substrate 110. Each of the plurality of horizontal gate lines HGL may be connected to a corresponding vertical gate line VGL. For example, the nth horizontal gate line HGLn may be connected to the nth vertical gate line VGLn through a line contact portion MDC. The line contact portion MDC may correspond to a portion where the gate insulating film GI is omitted in an overlapping area of the vertical gate line VGL and the horizontal gate line HGL. The nth horizontal gate line HGLn may be insulated from other vertical gate lines except for the nth vertical gate line HGLn among the plurality of vertical gate lines VGL in a non-contact portion NMC. For example, the nth horizontal gate line HGLn may be insulated from the n−1th vertical gate line HGLn−1 in the non-contact portion NMC.

The storage electrode STE may be disposed on the first substrate 110. The storage electrode STE may receive a storage voltage VST. For example, the storage electrode may be grounded, but the present disclosure is not necessarily limited thereto. The storage electrode STE may form a source electrode SE1 of the first switching element ST1 and a storage capacitor Cst of the first pixel SP1. The storage electrode STE may form a source electrode SE2 of the second switching element ST2 and a storage capacitor Cst of the second pixel SP2. The storage electrode STE may form a source electrode SE3 of the third switching element ST3 and a storage capacitor Cst of the third pixel SP3.

The auxiliary electrode AE may be disposed on the first substrate 110 to overlap the vertical gate line VGL. At least three surfaces of the auxiliary electrode AE may face the storage electrode STE on a plane. Each of the plurality of vertical gate lines VGL may be connected to a corresponding horizontal gate line HGL, and the entire length of the gate line GL may increase. Therefore, the auxiliary electrode AE may be in contact with each of the plurality of vertical gate lines VGL, thereby reducing the resistance of the plurality of vertical gate lines VGL.

The gate insulating film GI may cover the nth horizontal gate line HGLn, the storage electrode STE, and the auxiliary electrode AE. For example, the gate insulating film GI may include an inorganic insulating material such as a silicon compound or a metal oxide. The gate insulating film GI may be a single-layer film or a multi-layer film formed of different materials.

The plurality of data lines DL may be disposed on the gate insulating film GI. The plurality of data lines DL may extend in the second direction (Y-axis direction) and may be spaced apart from each other in the first direction (X-axis direction). For example, the plurality of pixels SP arranged along one column may receive data voltages through two data lines DL. Each of the plurality of data lines DL may supply a data voltage to a drain electrode DE1 of the first switching element ST1, a drain electrode DE2 of the second switching element ST2, or a drain electrode DE3 of the third switching element ST3.

Each of the n–1th vertical gate line VGLn–1 and the nth vertical gate line VGLn may be disposed on the gate insulating film GI. The n–1th vertical gate line VGLn–1 and the nth vertical gate line VGLn may extend in the second direction (Y-axis direction), and may be spaced apart from each other in the first direction (X-axis direction). Each of the n–1th vertical gate line VGLn–1 and the nth vertical gate line VGLn may intersect the nth horizontal gate line HGLn. For example, the n–1th vertical gate line VGLn–1 may be insulated from the nth horizontal gate line HGLn in the non-contact portion NMC. The nth vertical gate line VGLn may be connected to the nth horizontal gate line HGLn through the line contact portion MDC.

The passivation layer PAS may cover the plurality of data lines DL, the n–1th vertical gate line VGLn–1, the nth vertical gate line VGLn, and the first, second, and third switching elements ST1, ST2, and ST3. For example, the passivation layer PAS may be made of an organic material, and may protect the plurality of data lines DL, the n–1th vertical gate line VGLn–1, the nth vertical gate line VGLn, and the first, second, and third switching elements ST1, ST2, and ST3.

The first switching element ST1 of the first pixel SP1 may include a gate electrode GE1, an active region ACT1, a drain electrode DE1, and a source electrode SE1. The gate electrode GE1 of the first pixel SP1 is a part of the nth horizontal gate line HGLn, and may correspond to a region overlapping the active region ACT1 of the nth horizontal gate line HGLn. The active region ACT1 of the first switching element ST1 may be disposed on the gate insulating film GI. The drain electrode DE1 of the first switching element ST1 may cover one end of the active region ACT1, and the source electrode SE1 thereof may cover the other end of the active region ACT1. The drain electrode DE1 of the first switching element ST1 may be connected to the data line DL to receive a data voltage. The source electrode SE1 of the first switching element ST1 may be connected to the first pixel electrode, and may receive a data voltage when the first switching element ST1 is turned on.

The first switching element ST1 of the first pixel SP1 may be connected to the nth horizontal gate line HGL, and may be adjacent to the line contact portion MDC to which the nth vertical gate line VGLn and the nth horizontal gate line HGLn are connected. Therefore, when the nth vertical gate line VGLn adjacent to the first pixel SP1 supplies a gate-on voltage, the first switching device ST1 may receive a gate-on voltage from the nth horizontal gate line HGLn.

In FIG. 8, the gate electrode GE1 of the first switching element ST1 may correspond to one electrode of the first capacitor Cgs1, and the source electrode SE1 of the first switching element ST1 may correspond to the other electrode of the first capacitor Cgs1. For example, one electrode of the first capacitor Cgs1 of the first pixel SP1 may correspond to a part of the nth horizontal gate line HGLn, and the other electrode of the first capacitor Cgs1 may correspond to the source electrode SE1 of the first switching element ST1 overlapping the nth horizontal gate line HGLn. Therefore, the first capacitance of the first pixel SP1 may be formed between the gate electrode GE1 and the source electrode SE1 of the first switching element ST1.

A protection member PRT may be formed of the same material and disposed on the same layer as the active region ACT1 of the first switching element ST1. The protection member PRT may be formed in an overlapping area of the horizontal gate line HGL and the drain electrode DE1 of the first switching element ST1. The protection member PRT may prevent one end of the horizontal gate line HGL from contacting the drain electrode DE1 of the first switching element ST1.

The second switching element ST2 of the second pixel SP2 may include a gate electrode GE2, a drain electrode DE2, and a source electrode SE2. The gate electrode GE2 of the second pixel SP2 is a part of the nth horizontal gate line HGLn, and may correspond to a region overlapping an active region of the nth horizontal gate line HGLn. The drain electrode DE2 of the second pixel SP2 may be connected to the data line DL to receive a data voltage. The source electrode SE2 of the second pixel SP2 may be connected to the second pixel electrode, and may receive a data voltage when the second switching element ST2 is turned on.

The second switching element ST2 of the second pixel SP2 may be connected to the nth horizontal gate line HGL, and may be adjacent to the non-contact portion NMC where the n–1th vertical gate line VGLn–1 intersects the nth horizontal gate line HGLn. Therefore, when the n–1th vertical gate line VGLn–1 adjacent to the second pixel SP2 has a gate-off voltage, the second switching element ST2 may receive a gate-on voltage from the nth horizontal gate line HGLn.

The third switching element ST3 of the third pixel SP3 may include a gate electrode GE3, a drain electrode DE3, and a source electrode SE3. The gate electrode GE3 of the third switching element ST3 is a part of the nth horizontal gate line HGLn, and may correspond to a region overlapping an active region of the nth horizontal gate line HGLn. The drain electrode DE3 of the third switching element ST3 may be connected to the data line DL to receive a data voltage. The source electrode SE3 of the third switching element ST3 may be connected to the third pixel electrode, and may receive a data voltage when the third switching element ST3 is turned on.

The third pixel SP3 may be disposed between the first pixel SP1 and the second pixel SP2 or may be disposed between the adjacent second pixels SP2. For example, the third pixel SP3 may be disposed between the first pixel SP1 disposed in the pixel area where the nth vertical gate line VGLn intersect the nth horizontal gate line HGLn, and the second pixel SP2 disposed in the pixel area where the n−1th vertical gate line VGLn−1 intersects the nth horizontal gate line HGLn. Therefore, the third pixel SP3 may be closer to the first pixel SP1 or the second pixel SP2 than the n−1th vertical gate line VGLn−1 or nth vertical gate line VGLn. Since the third pixel SP3 does not have a directly adjacent vertical gate line VGL, the third pixel SP3 may be less affected by the second capacitance than the first pixel SP1 or the second pixel SP2.

Figure 9:
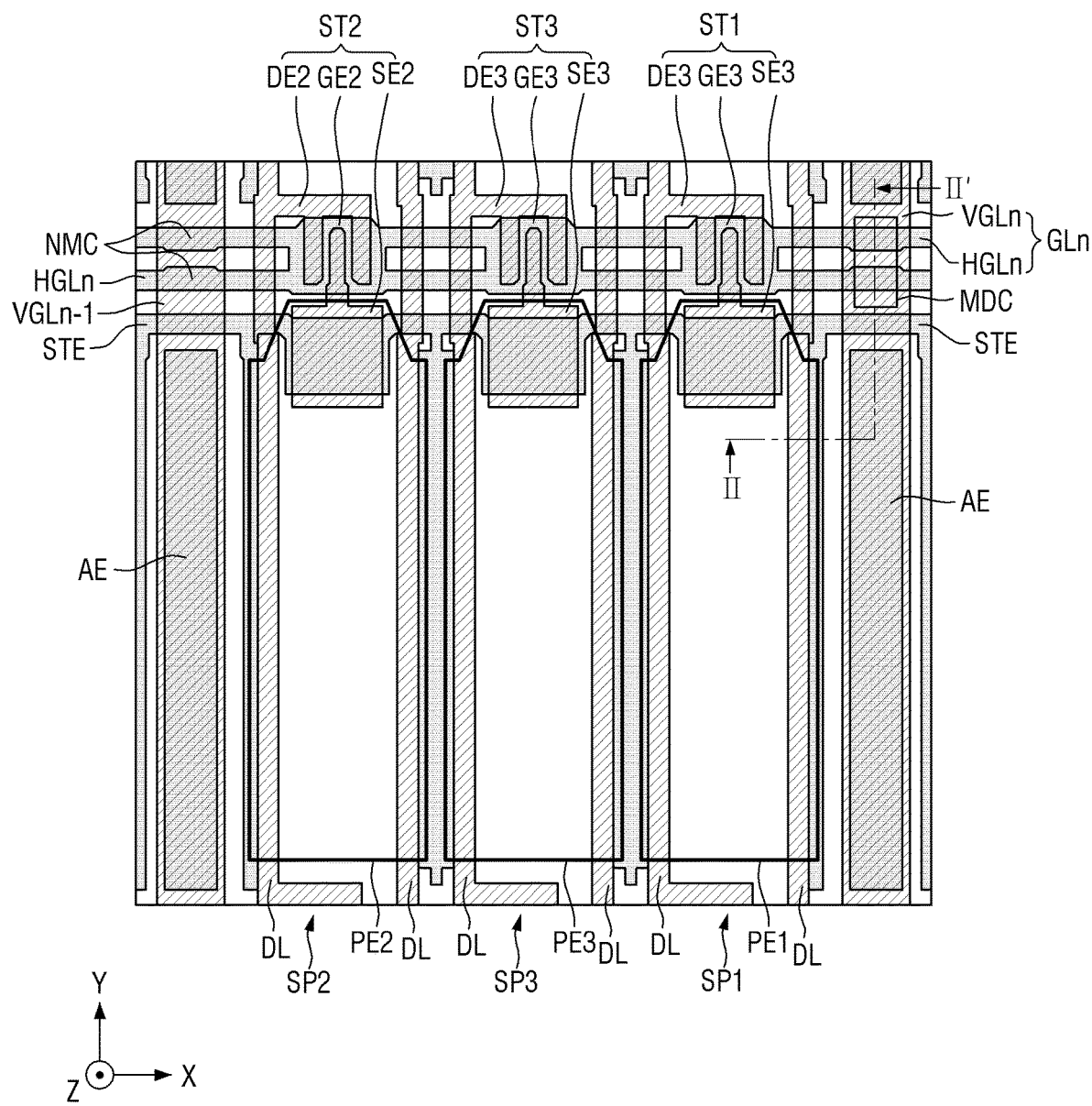
FIG. 9 is a plan view showing first to third pixels and first to third pixel electrodes in the display device according to an embodiment.
Figure 10:
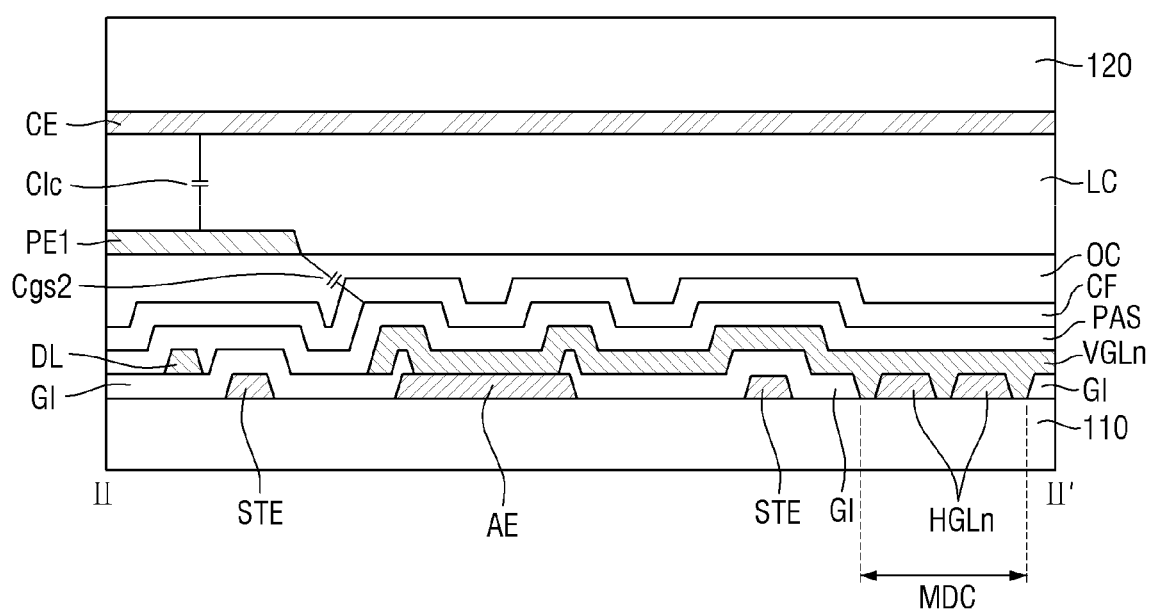
FIG. 10 is a cross-sectional view taken along the line II-II' of FIG. 9.

FIG. 9 is a plan view showing first, second, and third pixels and first, second, and third pixel electrodes in the display device according to an embodiment, and FIG. 10 is a cross-sectional view taken along line II-II' of FIG. 9. The display device shown in FIGS. 9 and 10 further includes first, second, and third pixel electrodes, and the same components as those described above will be briefly described or omitted.

Referring to FIGS. 9 and 10, the display panel 100 includes a first substrate 110, an nth horizontal gate line HGLn, a storage electrode STE, an auxiliary electrode AE, a gate insulating film GI, a plurality of data lines DL, an n−1th vertical gate line VGLn−1, an nth vertical gate line VGLn, a passivation layer PAS, first, second, and third pixels SP1, SP2, and SP3, a color filter CF, a planarization layer OC, a liquid crystal layer LC, a common electrode CE, and a second substrate 120.

The nth horizontal gate line HGLn may be disposed on the first substrate 110. Each of the plurality of horizontal gate lines HGL may be connected to a corresponding vertical gate line VGL. The nth horizontal gate line HGLn may supply gate signals to the gate electrodes GE1, GE2, and GE3 of each of the first, second, and third switching elements ST1, ST2, and ST3.

The storage electrode STE may be disposed on the first substrate 110. The storage electrode STE may receive a storage voltage VST.

The auxiliary electrode AE may be disposed on the first substrate 110 to overlap the vertical gate line VGL. The auxiliary electrode AE may be in contact with each of the plurality of vertical gate lines VGL, thereby reducing the resistance of the plurality of vertical gate lines VGL.

The gate insulating film GI may cover the nth horizontal gate line HGLn, the storage electrode STE, and the auxiliary electrode AE.

The plurality of data lines DL may be disposed on the gate insulating film GI. Each of the plurality of data lines DL may supply a data voltage to a drain electrode DE1 of the first switching element ST1, a drain electrode DE2 of the second switching element ST2, or a drain electrode DE3 of the third switching element ST3.

Each of the n−1th vertical gate line VGLn−1 and the nth vertical gate line VGLn may be disposed on the gate insulating film GI. The n−1th vertical gate line VGLn−1 and the nth vertical gate line VGLn may extend in the second direction (Y-axis direction), and may be spaced apart from each other in the first direction (X-axis direction). Each of the n−1th vertical gate line VGLn−1 and the nth vertical gate line VGLn may intersect the nth horizontal gate line HGLn. For example, the n−1th vertical gate line VGLn−1 may be insulated from the nth horizontal gate line HGLn in the non-contact portion NMC. The nth vertical gate line VGLn may be connected to the nth horizontal gate line HGLn through the line contact portion MDC. The line contact portion MDC may correspond to a portion where the gate insulating film GI is omitted in an overlapping region of the vertical gate line VGL and the horizontal gate line HGL.

The passivation layer PAS may cover the plurality of data lines DL, the n−1th vertical gate line VGLn−1, the nth vertical gate line VGLn, and the first, second, and third switching elements ST1, ST2, and ST3.

The first pixel SP1 may include a first switching element ST1 and a first pixel electrode PE1 connected to a source electrode SE1 of the first switching element ST1. For example, when the first pixel SP1 receives a gate-on voltage from the nth horizontal gate line HGLn, the nth vertical gate line VGLn adjacent to the first pixel SP1 may supply a gate-on voltage to the nth horizontal gate line HGLn. In this case, the first capacitor Cgs1 of the first switching element ST1 may be formed between the gate electrode GE1 and the source electrode SE1, and the second capacitor Cgs2 thereof may be formed between the first pixel electrode PE1 of the first pixel SP1 and the nth vertical gate line VGLn supplying the gate-on voltage.

The second pixel SP2 may include a second switching element ST2 and a second pixel electrode PE2 connected to a source electrode SE2 of the second switching element ST2. For example, when the second pixel SP2 receives a gate-on voltage from the nth horizontal gate line HGLn, the n−1th vertical gate line VGLn−1 adjacent to the second pixel SP2 may have a gate-off voltage. In this case, the first capacitor Cgs1 may be formed between the gate electrode GE2 and the source electrode SE2 of the second switching element ST2, and the second capacitor Cgs2 may be formed between the second pixel electrode PE2 of the second pixel SP2 and the n−1th vertical gate line VGLn−1 having the gate-off voltage.

The second capacitance between the first pixel electrode PE1 of the first pixel SP1 and the nth vertical gate line VGLn supplying the gate-on voltage may be different from the second capacitance between the second pixel electrode PE2 of the second pixel SP2 and the n−1th vertical gate line VGLn−1 having the gate-off voltage. For example, the magnitude of the second capacitance of the first pixel SP1 may be greater than the magnitude of the second capacitance of the second pixel SP2.

The third pixel SP3 may include a third switching element ST3 and a third pixel electrode PE3 connected to a source electrode SE3 of the third switching element ST3. The third pixel SP3 may be disposed between the first pixel SP1 disposed in the pixel area where the nth vertical gate line VGLn intersects the nth horizontal gate line HGLn, and the second pixel SP2 disposed in the pixel region where the n−1th vertical gate line VGLn−1 intersects the nth horizontal gate line HGLn. Since the third pixel SP3 does not have a directly adjacent vertical gate line VGL, the third pixel SP3 may be less affected by the second capacitance than the first pixel SP1 or the second pixel SP2.

For example, the first pixel SP1 has a second capacitance between the first pixel electrode PE1 and the nth vertical gate line VGLn supplying a gate-on voltage, the second pixel SP2 has a second capacitance between the second pixel electrode PE2 and the n−1th vertical gate line VGLn−1 having a gate off voltage, and the third pixel SP3 may be less affected by the second capacitance than the first pixel SP1 or the second pixel SP2.

The color filter CF may be disposed on the passivation layer PAS to overlap each of the first, second, and third pixel electrodes PE1, PE2, and PE3. The color filter CF may provide a specific color to light passing through the display panel 100. The color filter CF may include first, second, and third color filters that transmit light of different colors. The first color filter may overlap the first pixel electrode PE1, the second color filter may overlap the second pixel electrode PE2, and the third color filter may overlap the third pixel electrode PE3. For example, each of the first, second, and third color filters may be one of a red color filter, a green color filter, and a blue color filter.

The planarization layer OC may cover the color filter CF and planarize the upper portion of the first substrate 110.

Each of the first, second, and third pixel electrodes PE1, PE2, and PE3 may be disposed on the planarization layer OC. The first, second, and third pixel electrodes PE1, PE2, and PE3 may be connected to the source electrodes SE1, SE2, and SE3 of the first, second, and third switching elements ST1, ST2, and ST3, respectively. Each of the first, second, and third pixel electrodes PE1, PE2, and PE3 may face the common electrode CE on the second substrate 120.

The liquid crystal layer LC may be formed between the first substrate 110 and the second substrate 120. The liquid crystal layer LC may be disposed between the first pixel electrode PE1 and the common electrode CE. That is, the liquid crystal capacitor Clc may be formed between the first pixel electrode PE1 and the common electrode CE to maintain a voltage between the first pixel electrode PE1 and the common electrode CE. Therefore, the arrangement of liquid crystal molecules in the liquid crystal layer LC may be changed depending on the voltage between the first pixel electrode PE1 and the common electrode CE, thereby changing the transmittance of light passing through the liquid crystal layer LC.

The common electrode CE may be disposed on the second substrate 120. When the second substrate 120 is attached to the first substrate 110, the common electrode CE on the second substrate 120 may face the first, second, and third pixel electrodes PE1, PE2, and PE3 on the first substrate 110.

Figure 11:
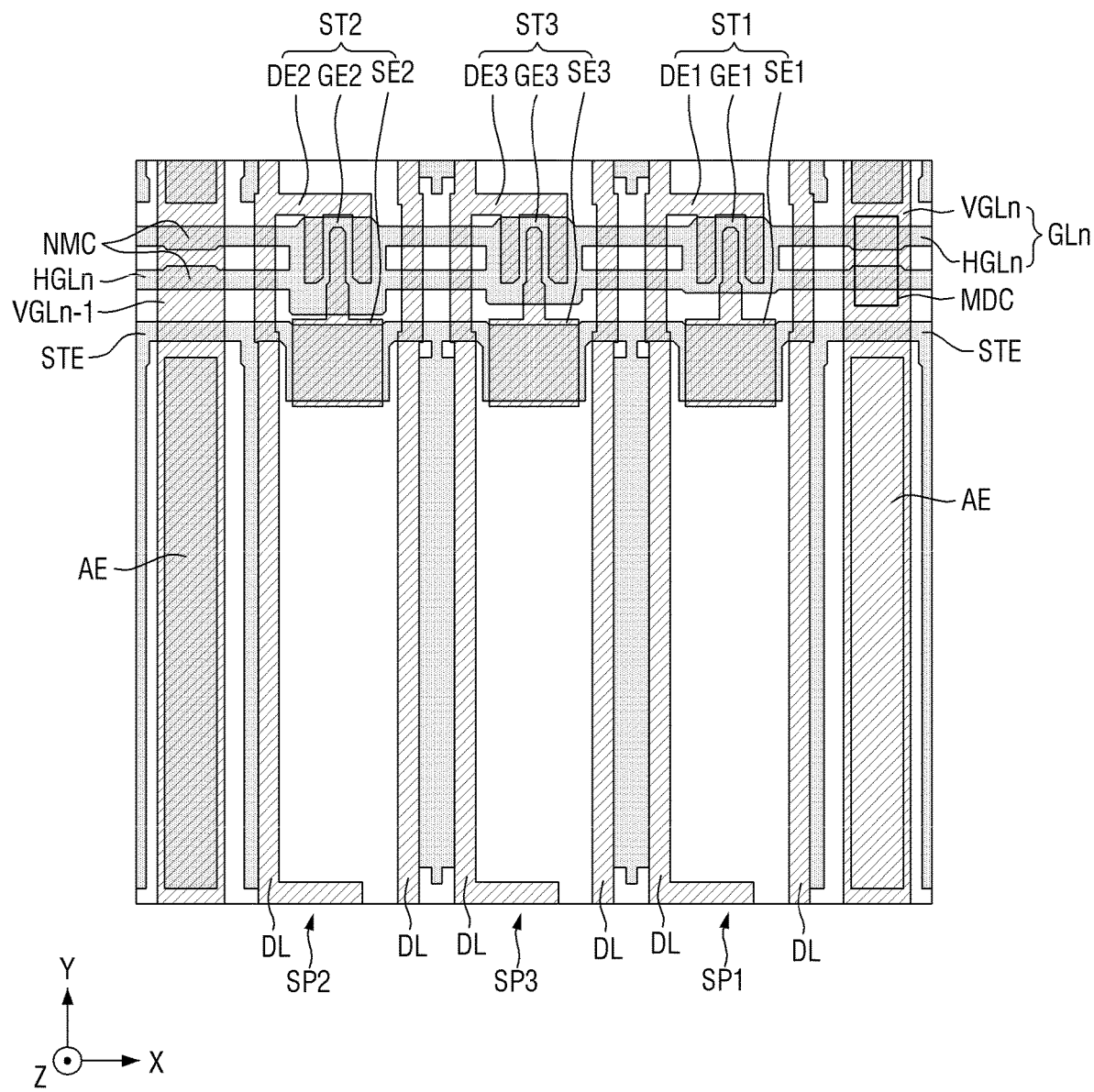
FIG. 11 is a plan view showing first to third switching elements in the display device according to an embodiment.
Figure 12:
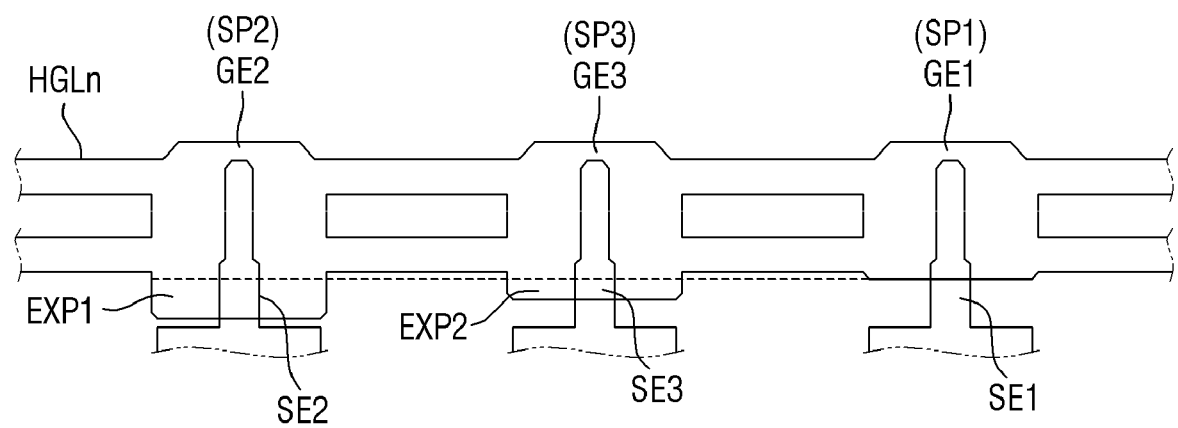
FIG. 12 is briefly showing a gate electrode and a source electrode of each of the first to third switching elements shown in FIG. 11.

FIG. 11 is a plan view showing first, second, and third switching elements in the display device according to an embodiment, and FIG. 12 is briefly showing a gate electrode and a source electrode of each of the first, second, and third switching elements shown in FIG. 11. Hereinafter, the same components as those described above will be briefly described or omitted.

Referring to FIGS. 11 and 12, the first pixel SP1 may include a first switching element ST1 connected to a corresponding horizontal gate line HGL among the plurality of horizontal gate lines HGL and disposed adjacent to the line contact portion MDC. The first capacitor Cgs1 of the first pixel SP1 may be formed between the gate electrode GE1 and the source electrode SE1 of the first switching element ST1, and the second capacitor Cgs2 of the first pixel SP1 may be formed between the second pixel electrode PE2 and the nth vertical gate line VGLn supplying a gate-on voltage.

The second pixel SP2 may include a second switching element ST2 connected to the horizontal gate line HGL to which the first pixel SP1 is connected and disposed adjacent to the non-contact portion NMC. The first capacitor Cgs1 of the second pixel SP2 may be formed between the gate electrode GE2 and the source electrode SE2 of the second switching element ST2, and the second capacitor Cgs2 of the second pixel SP2 may be formed between the second pixel electrode PE2 and the n−1th vertical gate line VGLn−1 having a gate-off voltage.

The first capacitance between the gate electrode GE1 and the source electrode SE1 of the first switching element ST1 of the first pixel SP1 may be different from the first capacitance between the gate electrode GE2 and the source electrode SE2 of the second switching element ST2 of the second pixel SP2. The second capacitance between the first pixel electrode PE1 of the first pixel SP1 and the nth vertical gate line VGLn supplying a gate-on voltage may be different from the second capacitance between the second pixel electrode PE2 of the second pixel SP2 and the n−1th vertical gate line VGLn−1 having a gate-off voltage. For example, the second capacitance between the first pixel electrode PE1 of the first pixel SP1 and the nth vertical gate line VGLn supplying a gate-on voltage may be greater than the second capacitance between the second pixel electrode PE2 of the second pixel SP2 and the n−1th vertical gate line VGLn−1 having a gate-off voltage.

The gate electrode GE2 of the second switching element ST2 may include a first extension portion EXP1 protruding toward the second source electrode SE2. The size of the gate electrode GE2 of the second switching element ST2 may be larger than that of the gate electrode GE1 of the first switching element ST1. That is, the length (along the Y-axis direction) of the gate electrode GE2 of the second switching element ST2 may be larger than that of the gate electrode GE1 of the first switching element ST1. The magnitude of the first capacitance between the gate electrode GE2 and the source electrode SE2 of the second switching element ST2 may be greater than the magnitude of the first capacitance between the gate electrode GE1 and the source electrode SE1 of the first switching element ST1. Therefore, the display device may adjust a difference between the first capacitance of the first pixel SP1 and the first capacitance of the second pixel SP2, thereby compensating for the difference between the first capacitance of the first pixel SP1 and the first capacitance of the second pixel SP2. The display device may compensate for the difference between the first capacitance of the first pixel SP1 and the first capacitance of the second pixel SP2, thereby minimizing a difference in kick-back voltage between the plurality of pixels SP and preventing spots caused by luminance variations of the plurality of pixels SP.

The third pixel SP3 may be disposed between the first pixel SP1 disposed in the pixel area where the nth vertical gate line VGLn intersects the nth horizontal gate line HGLn, and the second pixel SP2 disposed in the pixel area where the n−1th vertical gate line VGLn−1 intersects the n−th horizontal gate line HGLn. Since the third pixel SP3 does not have a directly adjacent vertical gate line VGL, the third pixel SP3 may be less affected by the second capacitance than the first pixel SP1 or the second pixel SP2.

For example, the first pixel SP1 has a second capacitance between the first pixel electrode PE1 and the nth vertical gate line VGLn supplying a gate-on voltage, the second pixel SP2 has a second capacitance between the second pixel electrode PE2 and the n−1th vertical gate line VGLn−1 having a gate off voltage, and the third pixel SP3 may be less affected by the second capacitance than the first pixel SP1 or the second pixel SP2. In this case, the first, second and third pixels SP1, SP2, and SP3 may have different kick-back voltages except for the value of the first capacitance.

The gate electrode GE3 of the third switching element ST3 may include a second extension portion EXP2 protruding toward the third source electrode SE3. The size of the second extension portion EXP2 may be smaller than that of the first extension portion EXP1. That is, the length (along the Y-axis direction) of the second extension portion EXP2 may be smaller than that of the first extension portion EXP1. Since the size (the length along the Y-axis direction) of the gate electrode GE3 of the third switching element ST3 may be larger than that of the gate electrode GE1 of the first switching element ST1, the magnitude of the first capacitance of the third switching element ST3 may be greater than the magnitude of the first capacitance of the first switching element ST1. Since the size (the length along the Y-axis direction) of the gate electrode GE2 of the second switching element ST2 may be larger than that of the gate electrode GE3 of the third switching element ST3, the magnitude of the first capacitance of the second switching element ST2 may be greater than the magnitude of the first capacitance of the third switching element ST3.

Therefore, the display device may adjust a difference among the first capacitance of the first pixel SP1, the first capacitance of the second pixel SP2, and the first capacitance of the third pixel SP3, thereby minimizing a difference in kick-back voltage among the first, second, and third pixels SP1, SP2, and SP3. The display device may compensate for the difference in kick-back voltage among the first, second, and third pixels SP1, SP2, and SP3, thereby preventing spots caused by luminance variations of the plurality of pixels SP.

Figure 13:
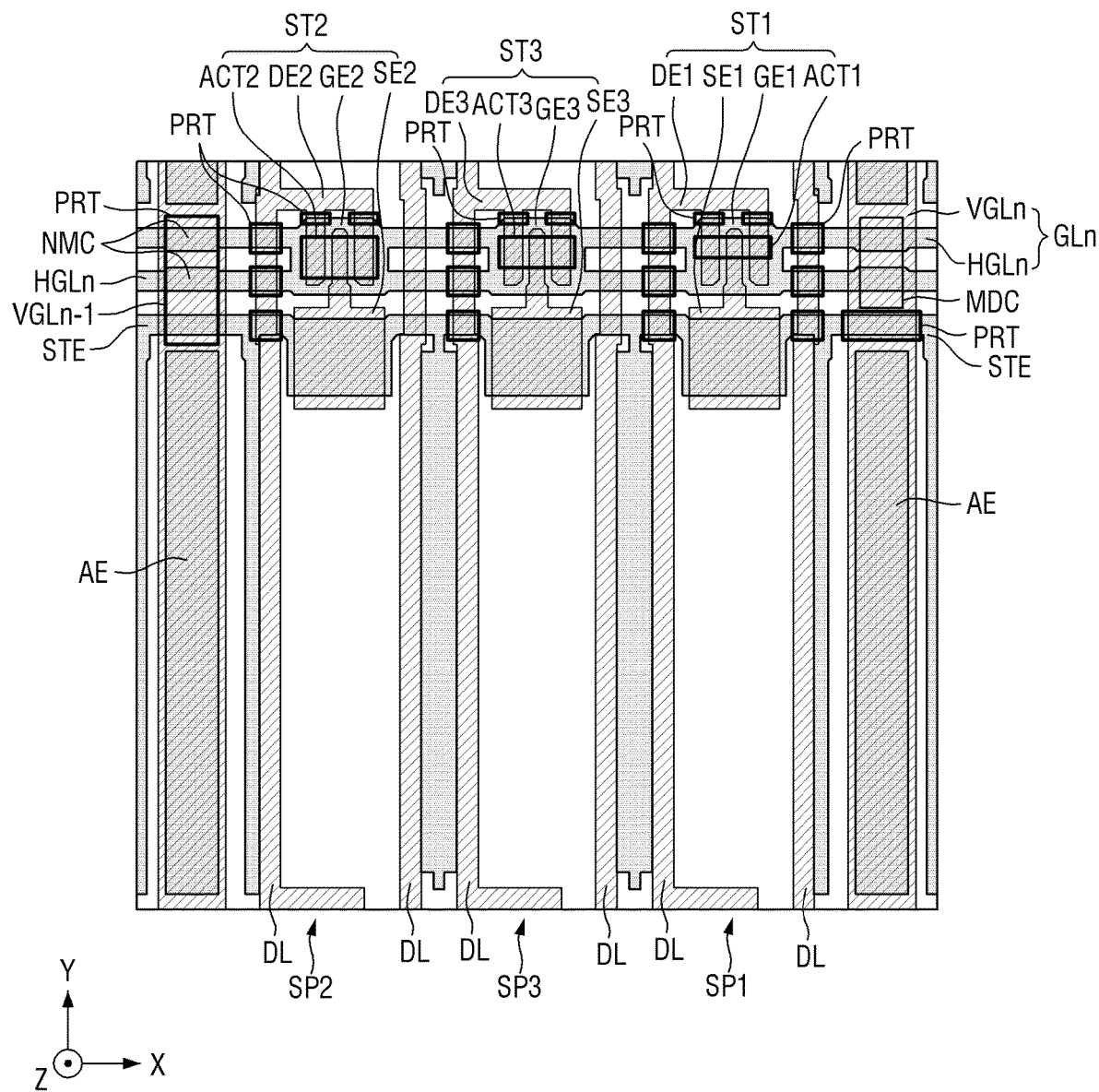
FIG. 13 is a plan view showing first to third switching elements in a display device according to another embodiment.
Figure 14:
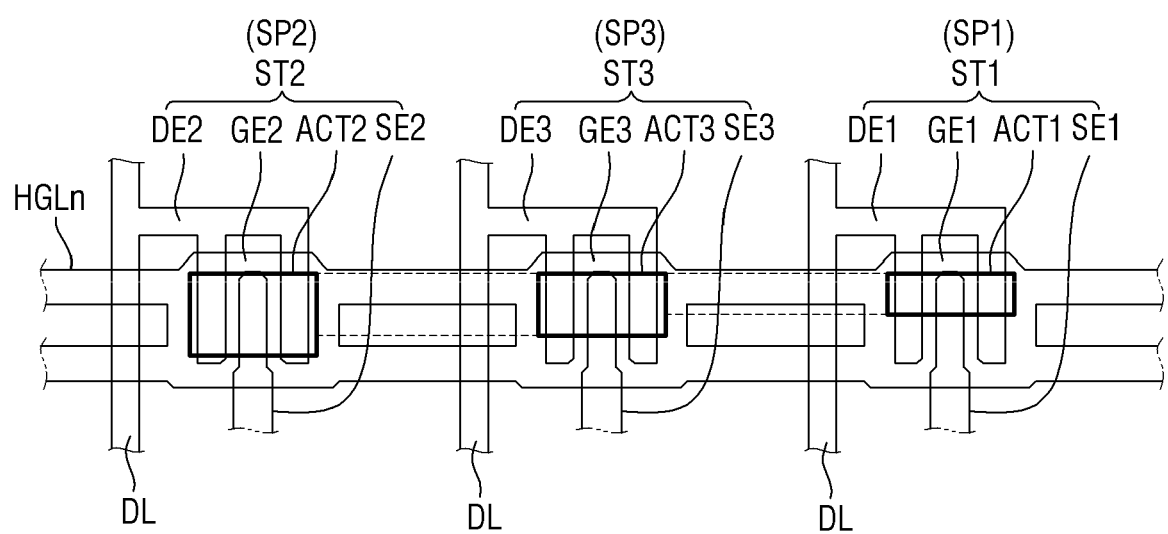
FIG. 14 is briefly showing the first to third switching elements shown in FIG. 13.

FIG. 13 is a plan view showing first to third switching elements in a display device according to another embodiment, and FIG. 14 is briefly showing the first to third switching elements shown in FIG. 3. The display device of FIGS. 13 and 14 is different from the display device of FIGS. 11 and 12 in the configurations of first, second, and third switching elements, and thus, the same components as those described above will be briefly described or omitted.

Referring to FIGS. 13 and 14, the first switching element ST1 of the first pixel SP1 may include a gate electrode GE1, an active region ACT1, a drain electrode DE1, and a source electrode SE1. The gate electrode GE1 of the first pixel SP1 is a part of the nth horizontal gate line HGLn, and may correspond to a region overlapping the active region ACT1 of the nth horizontal gate line HGLn. The active region ACT1 of the first pixel SP1 may be disposed on the gate insulating film GI. The drain electrode DE1 of the first pixel SP1 may cover one end of the active region ACT1, and the source electrode SE1 thereof may cover the other end of the active region ACT1. The drain electrode DE1 of the first pixel SP1 may be connected to the data line DL to receive a data voltage. The source electrode SE1 of the first pixel SP1 may be connected to the first pixel electrode, and may receive a data voltage when the first switching element ST1 is turned on.

The second switching element ST2 of the second pixel SP2 may include a gate electrode GE2, an active region ACT2, a drain electrode DE2, and a source electrode SE2. The third switching element ST3 of the third pixel SP3 may include a gate electrode GE3, an active region ACT3, a drain electrode DE3, and a source electrode SE3.

The protection member PRT may be formed of the same material and disposed on the same layer as the active region ACT1 of the first switching element ST1. The protection member PRT may be formed in an overlapping area of the data line DL and the horizontal gate line HGL and may be formed in an overlapping area of the data line DL and the storage electrode STE. The protection member PRT may be formed in the non-contact portion NMC, and may be formed in an overlapping region of the vertical gate line VGL and the storage electrode STE. The protection member PRT may be formed in an overlapping region of the horizontal gate line HGL and the drain electrode DE1 of the first switching element ST1. Accordingly, the protection member PRT may prevent the horizontal gate line HGL or storage electrode STE disposed in a first layer from contacting the data line DL, drain electrodes DE1, DE2, and DE3, or vertical gate line VGL disposed in a second layer on the first layer.

The first capacitance between the gate electrode GE1 and the source electrode SE1 of the first switching element ST1 of the first pixel SP1 may be different from the first capacitance between the gate electrode GE2 and the source electrode SE2 of the second switching element ST2 of the second pixel SP2. The second capacitance between the first pixel electrode PE1 of the first pixel SP1 and the nth vertical gate line VGLn supplying a gate-on voltage may be different from the second capacitance between the second pixel electrode PE2 of the second pixel SP2 and the n-1th vertical gate line VGLn-1 having a gate-off voltage. For example, the second capacitance between the first pixel electrode PE1 of the first pixel SP1 and the nth vertical gate line VGLn supplying a gate-on voltage may be greater than the second capacitance between the second pixel electrode PE2 of the second pixel SP2 and the n-1th vertical gate line VGLn-1 having a gate-off voltage.

The first, second, and third of the active region ACT2 of the second switching element ST2 may be larger than the size of the active region ACT1 of the first switching element ST1. Thus, the substantial area of the source electrode SE2 of the second switching element ST2, the source electrode SE2 serving as one electrode of the first capacitor Cgs1 of the second switching element ST2 may be larger than the source electrode SE1 of the first switching element ST1. Therefore, the magnitude of the first capacitance between the gate electrode GE2 and the source electrode SE2 of the second switching element ST2 may be greater than the magnitude of the first capacitance between the gate electrode GE1 and the source electrode SE1 of the first switching element ST1. Therefore, the display device may adjust a difference between the first capacitance of the first pixel SP1 and the first capacitance of the second pixel SP2, thereby compensating for the difference between the first capacitance of the first pixel SP1 and the first capacitance of the second pixel SP2. The display device may compensate for the difference between the first capacitance of the first pixel SP1 and the first capacitance of the second pixel SP2, thereby minimizing a difference in kick-back voltage between the plurality of pixels SP and preventing spots caused by luminance variations of the plurality of pixels SP.

The third pixel SP3 may be disposed between the first pixel SP1 disposed in the pixel area where the nth vertical gate line VGLn intersects the nth horizontal gate line HGLn, and the second pixel SP2 disposed in the pixel area where the n-1th vertical gate line VGLn-1 intersects the nth horizontal gate line HGLn. Since the third pixel SP3 does not have a directly adjacent vertical gate line VGL, the third pixel SP3 may be less affected by the second capacitance than the first pixel SP1 or the second pixel SP2.

For example, the first pixel SP1 has a second capacitance between the first pixel electrode PE1 and the nth vertical gate line VGLn supplying a gate-on voltage, the second pixel SP2 has a second capacitance between the second pixel electrode PE2 and the n-1th vertical gate line VGLn-1 having a gate off voltage, and the third pixel SP3 may be less affected by the second capacitance than the first pixel SP1 or the second pixel SP2. In this case, the first to third pixels SP1, SP2, and SP3 may have different kick-back voltages except for the value of the first capacitance.

The size (the length along the Y-axis direction) of the active region ACT3 of the third switching element ST3 may be larger than that of the active region ACT1 of the first switching element ST1. Therefore, the substantial area of the source electrode SE3 of the third switching element ST3, the source electrode SE3 serving as one electrode of the first capacitor Cgs1 of the third switching element ST3, may be larger than the source electrode SE1 of the first switching element ST1 so that the magnitude of the first capacitance of the third switching element ST3 may be greater than the magnitude of the first capacitance of the first switching element ST1.

The size (the length along the Y-axis direction) of the active region ACT2 of the second switching element ST2 may be larger than that of the active region ACT3 of the third switching element ST3. Therefore, the substantial area of the source electrode SE2 of the second switching element ST2, the source electrode SE2 serving as one electrode of the first capacitor Cgs1 of the second switching element ST2, may be larger than the source electrode SE3 of the third switching element ST3 so that the magnitude of the first capacitance of the second switching element ST2 may be greater than the magnitude of the first capacitance of the third switching element ST3.

Therefore, the display device may adjust a difference among the first capacitance of the first pixel SP1, the first capacitance of the second pixel SP2, and the first capacitance of the third pixel SP3, thereby minimizing a difference in kick-back voltage among the first, second, and third pixels SP1, SP2, and SP3. The display device may compensate for the difference in kick-back voltage among the first, second, and third pixels SP1, SP2, and SP3, thereby preventing spots caused by luminance variations of the plurality of pixels SP.

Figure 15:
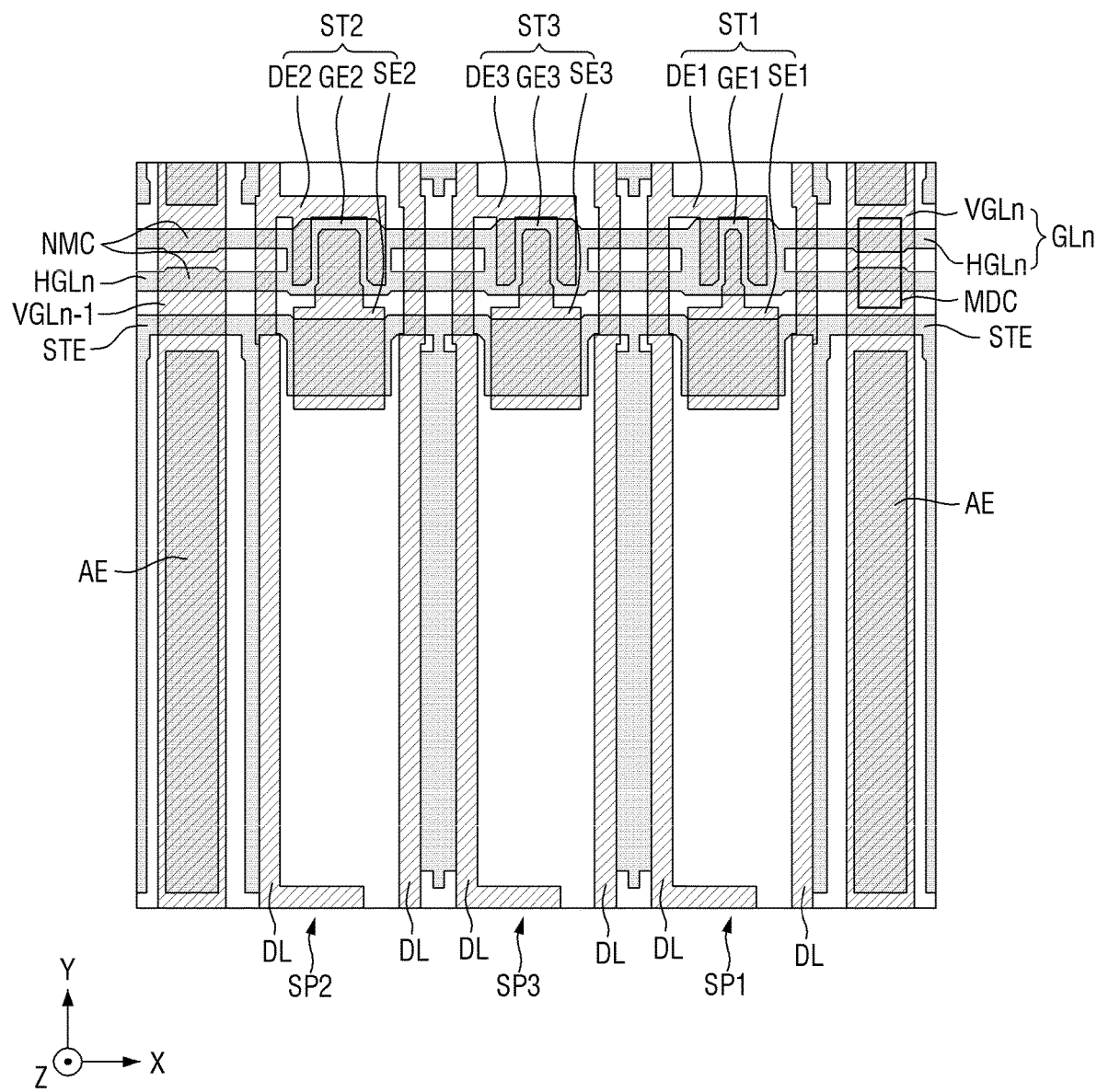
FIG. 15 is a plan view showing first to third switching elements in a display device according to still another embodiment.
Figure 16:
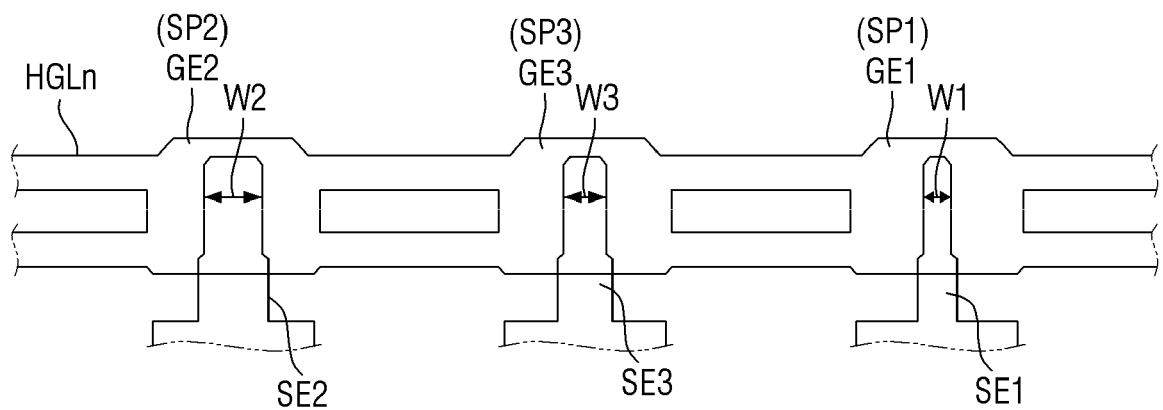
FIG. 16 is briefly showing a gate electrode and a source electrode of each of the first, second, and third switching elements shown in FIG. 15.

FIG. 15 is a plan view showing first to third switching elements in a display device according to still another embodiment, and FIG. 16 is briefly showing a gate electrode and a source electrode of each of the first to third switching elements shown in FIG. 15.

Referring to FIGS. 15 and 16, the first capacitance between the gate electrode GE1 and the source electrode SE1 of the first switching element ST1 of the first pixel SP1 may be different from the first capacitance between the gate electrode GE2 and the source electrode SE2 of the second switching element ST2 of the second pixel SP2. The second capacitance between the first pixel electrode PE1 of the first pixel SP1 and the nth vertical gate line VGLn supplying a gate-on voltage may be different from the second capacitance between the second pixel electrode PE2 of the second pixel SP2 and the n–1th vertical gate line VGLn–1 having a gate-off voltage. For example, the second capacitance between the first pixel electrode PE1 of the first pixel SP1 and the nth vertical gate line VGLn supplying a gate-on voltage may be greater than the second capacitance between the second pixel electrode PE2 of the second pixel SP2 and the n–1th vertical gate line VGLn–1 having a gate-off voltage.

The width W2 of the source electrode SE2 of the second switching element ST2 may be greater than the width W1 of the source electrode SE1 of the first switching element ST1. Here, the width W2 of the source electrode SE2 of the second switching element ST2 and the width W1 of the source electrode SE1 of the first switching element ST1 may correspond to widths in an area overlapping the horizontal gate electrode HGL. Therefore, the magnitude of the first capacitance between the gate electrode GE2 and the source electrode SE2 of the second switching element ST2 may be greater than the magnitude of the first capacitance between the gate electrode GE1 and the source electrode SE1 of the first switching element ST1. Therefore, the display device may adjust a difference between the first capacitance of the first pixel SP1 and the first capacitance of the second pixel SP2, thereby compensating for the difference between the first capacitance of the first pixel SP1 and the first capacitance of the second pixel SP2. The display device may compensate for the difference between the first capacitance of the first pixel SP1 and the first capacitance of the second pixel SP2, thereby minimizing a difference in kick-back voltage between the plurality of pixels SP and preventing spots caused by luminance variations of the plurality of pixels SP.

The third pixel SP3 may be disposed between the first pixel SP1 disposed in the pixel area where the nth vertical gate line VGLn intersect the nth horizontal gate line HGLn, and the second pixel SP2 disposed in the pixel area where the n–1th vertical gate line VGLn–1 intersects the nth horizontal gate line HGLn. Since the third pixel SP3 does not have a directly adjacent vertical gate line VGL, the third pixel SP3 may be less affected by the second capacitance than the first pixel SP1 or the second pixel SP2.

For example, the first pixel SP1 has a second capacitance between the first pixel electrode PE1 and the nth vertical gate line VGLn supplying a gate-on voltage, the second pixel SP2 has a second capacitance between the second pixel electrode PE2 and the n–1th vertical gate line VGLn–1 having a gate off voltage, and the third pixel SP3 may be less affected by the second capacitance than the first pixel SP1 or the second pixel SP2. In this case, the first, second, and third pixels SP1, SP2, and SP3 may have different kick-back voltages from each other except for the value of the first capacitance.

The width W3 of the source electrode SE3 of the third switching element ST3 may be greater than the width W1 of the source electrode SE1 of the first switching element ST1. Here, the width W3 of the source electrode SE3 of the third switching element ST3 and the width W1 of the source electrode SE1 of the first switching element ST1 may correspond to widths in an area overlapping the horizontal gate electrode HGL. Therefore, the magnitude of the first capacitance of the third switching element ST3 may be greater than the magnitude of the first capacitance of the first switching element ST1.

The width W2 of the source electrode SE2 of the second switching element ST2 may be greater than the width W3 of the source electrode SE3 of the third switching element ST3. Here, the width W2 of the source electrode SE2 of the second switching element ST2 and the width W3 of the source electrode SE3 of the third switching element ST3 may correspond to widths in an area overlapping the horizontal gate electrode HGL. Therefore, the magnitude of the first capacitance of the second switching element ST2 may be greater than the magnitude of the first capacitance of the third switching element ST3.

Therefore, the display device may adjust a difference among the first capacitance of the first pixel SP1, the first capacitance of the second pixel SP2, and the first capacitance of the third pixel SP3, thereby minimizing a difference in kick-back voltage among the first, second, and third pixels SP1, SP2, and SP3. The display device may compensate for the difference in kick-back voltage among the first, second, and third pixels SP1, SP2, and SP3, thereby preventing spots caused by luminance variations of the plurality of pixels SP.

Figure 17:
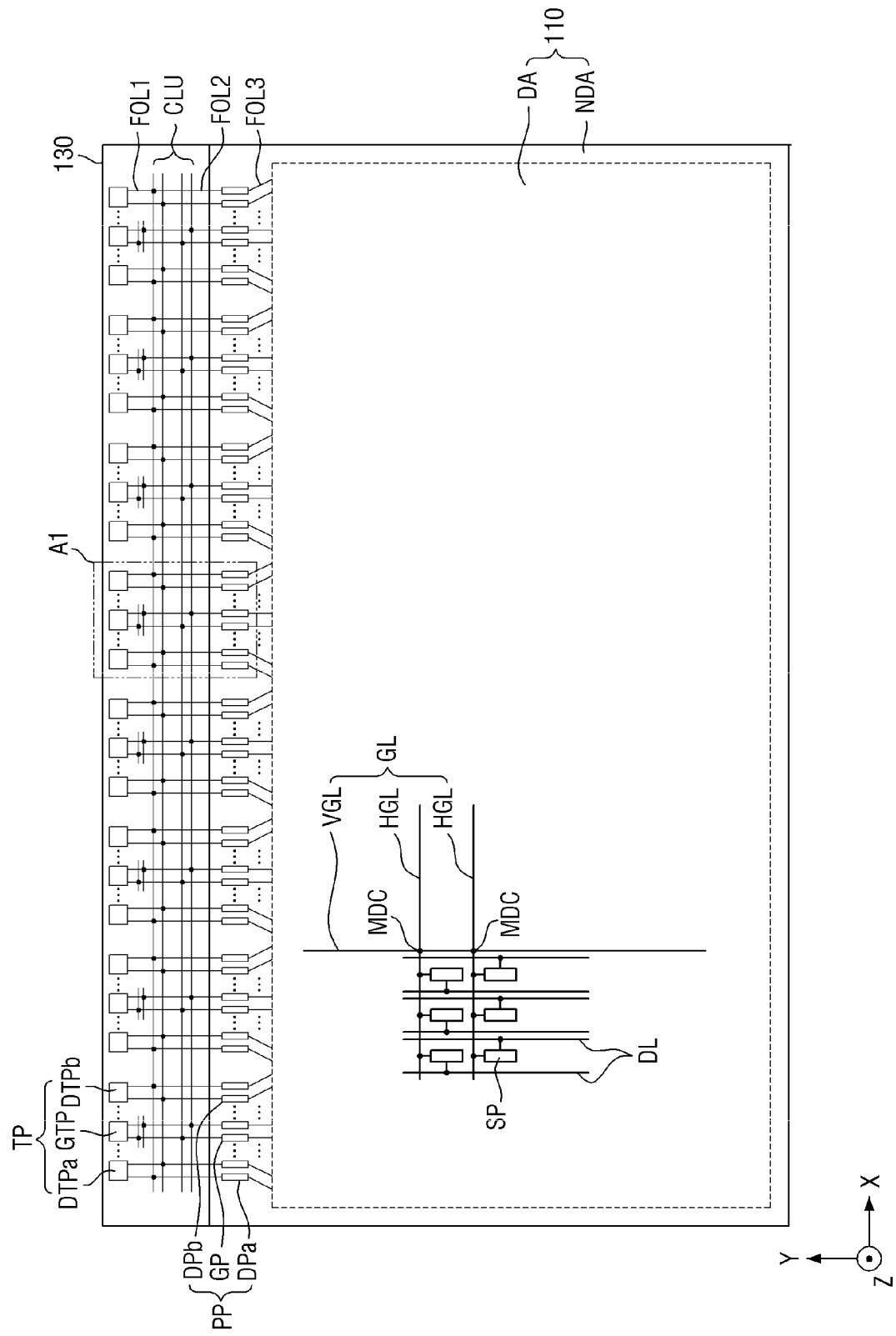
FIG. 17 is a plan view showing a display device of an inspection process in a method of inspecting a display device according to an embodiment.

FIG. 17 is a plan view showing a display device of an inspection process in a method of inspecting a display device according to an embodiment. The first substrate 110 of the display panel of FIG. 17 is the same as the first substrate 110 of FIG. 2, and the same configuration as the above-described configuration will be briefly described or omitted.

Referring to FIG. 17, the display panel 100 may include a first substrate 110 and a third substrate 130.

The first substrate 110 may include a display area DA and a non-display area NDA.

The display area DA, which is an area for displaying an image, may be defined as a central area of the first substrate 110. The display area DA may include a plurality of pixels SP formed in each pixel area intersected by a plurality of data lines DL and a plurality of gate lines GL. The plurality of gate lines GL may include a plurality of first gate lines VGL and a plurality of second gate lines HGL. For example, the plurality of first gate lines may be a plurality of vertical gate lines VGL connected to gate pad units GP and extending in the second direction (Y-axis direction), and the plurality of second gate lines may be a plurality of horizontal gate lines HGL connected to any one of the plurality of vertical gate lines VGL and extending in the first direction (X-axis direction). Each of the plurality of pixels SP may be connected to at least one horizontal gate line HGL and at least one data line DL. Each of the plurality of pixels SP may be defined as an area of a minimum unit for outputting light.

The non-display area NDA may be defined as the remaining area of the first substrate 110 other than the display area DA. For example, the non-display area NDA may include a plurality of panel pad units PP and a plurality of third fan-out lines FOL3.

Each of the plurality of panel pad units PP may include a plurality of first data pad units DPa, a plurality of gate pad units GP, and a plurality of second data pad units DPb. The arrangement of the plurality of first data pad units DPa, the plurality of gate pad units GP, and the plurality of second data pad units DPb is not limited to the illustrations of FIGS. 17, 18, and 19, and may be varied depending on the configurations of the first substrate 110 and the third substrate 130. For example, one panel pad unit PP may correspond to one flexible film 210. Each of the plurality of panel pad units PP may be connected to each of the plurality of flexible films 210.

The plurality of first data pad units DPa may be arranged at one side of the panel pad unit PP, and the plurality of second data pad units DPb may be arranged at the other side of the panel pad unit PP. The plurality of first data pad units DPa are different from the plurality of second data pad units DPb in arrangement, but the plurality of first data pad units DPa may be substantially the same as the plurality of second data pad units DPb in structure and function. The first and second data pad units DPa and DPb may be connected to the first and second data test pad units DTPa and DTPb through the first fan-out lines FOL1, the connection line unit CLU, and the second fan-out lines FOL2. The first and second data pad units DPa and DPb may be connected to the data lines DL through the third fan-out line FOL3. Accordingly, the first and second data pad units DPa and DPb may supply data test voltages received from the first and second data test pad units DTPa and DTPb to the data lines DL, respectively.

The plurality of gate pad units GP may be arranged between the plurality of first data pad units DPa and the plurality of second data pad units DPb. The gate pad unit GP may be connected to the gate test pad unit GTP through the first fan-out lines FOL1, the connection line unit CLU, and the second fan-out lines FOL2. The gate pad unit GP may be connected to the vertical gate lines VGL through the third fan-out line FOL3. Accordingly, the gate pad unit GP may supply a gate test signal received from the gate test pad unit GTP to the vertical gate lines VGL.

The third substrate 130 may extend from one end of the first substrate 110. The third substrate 130 may be formed together with the first substrate 110 in the process of manufacturing the display panel 100, and may be used in the process of inspecting the lighting of the display panel 100. The third substrate 130 may include a plurality of test pad units TP. The plurality of test pad units TP may be connected to an external light source (not shown) during the process of inspecting the lighting of the display panel 100, and may receive a data test voltage and a gate test signal from the external light source. For example, the data test voltage may be a gray voltage that turns on the plurality of pixels SP or a black voltage that turns off the plurality of pixels SP, but is not limited thereto. When the lighting inspection of the display panel 100 is completed, the third substrate 130 may be separated from the first substrate 110.

Each of the plurality of test pad units TP may include a plurality of first data test pad units DTPa, a plurality of gate test pad units GTP, and a plurality of second data test pad units DTPb. The arrangement of the plurality of first data test pad units DTPa, the plurality of gate test pad units GTP, and the plurality of second data test pad units DTPb is not limited to the illustrations of FIGS. 17, 18, and 19, and may be varied depending on the configuration of the first substrate 110 and the third substrate 130. One test pad unit TP may correspond to one panel pad unit PP of the first substrate 110. Each of the plurality of test pad units TP may be connected to each of the plurality of panel pad units PP of the first substrate 110.

The plurality of first data test pad units DTPa may be arranged at one end of the test pad unit TP, and the plurality of second data test pad units DTPb may be arranged at the other side of the test pad unit TP. The plurality of first data test pad units DTPa are different from the plurality of second data test pad units DTPb in arrangement, but the plurality of first data test pad units DTPa may be substantially the same as the plurality of second data test pad units DTPb in structure and function. The first and second data test pad units DTPa and DTPb may be connected to the first and second data pad units DPa and DPb through the first fan-out lines FOL1, the connection line unit CLU, and the second fan-out lines FOL2. Accordingly, the first and second data test pad units DTPa and DTPb may supply data test voltages received from the external light source to the first and second data pad units DPa and DPb, respectively.

The plurality of gate test pad units GTP may be arranged between the plurality of first data test pad units DTPa and the plurality of second test data pad units DTPb. The gate test pad unit GTP may be connected to the gate pad unit GP through the first fan-out lines FOL1, the connection line unit CLU, and the second fan-out lines FOL2. Accordingly, the gate test pad unit GTP may supply a gate test signal received from the external lighter to the vertical gate lines VGL.

Figure 18:
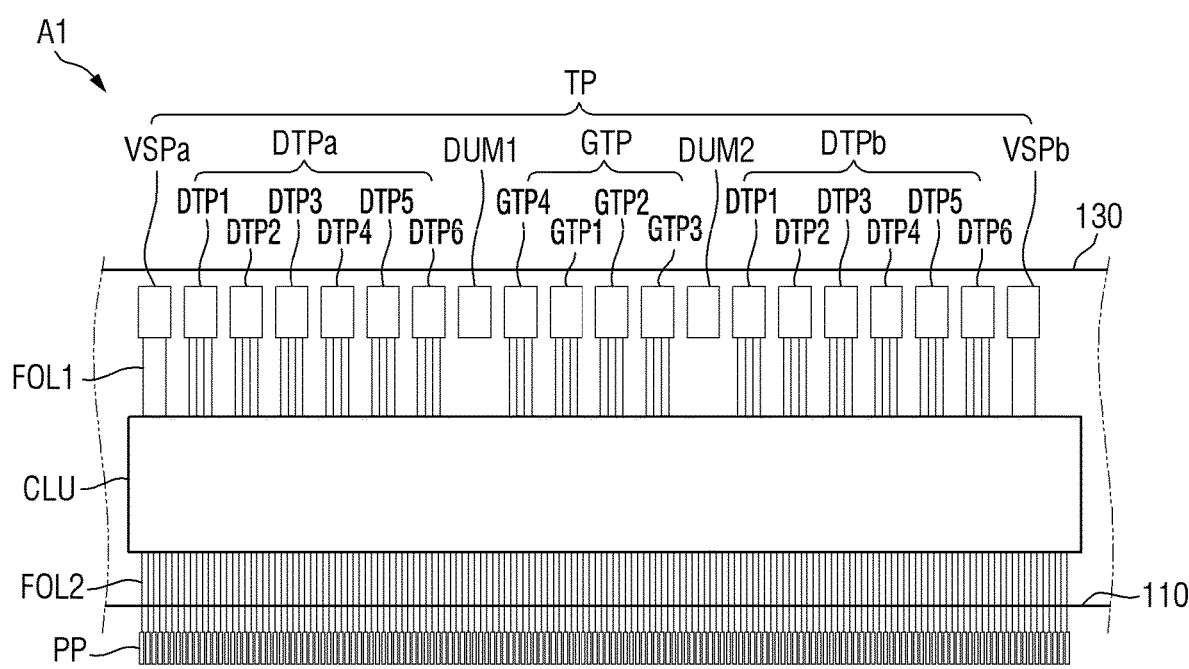
FIG. 18 is an enlarged view of area A1 of FIG. 17.

FIG. 18 is an enlarged view of area A1 of FIG. 17.

Referring to FIG. 18, the test pad unit TP includes a plurality of first data test pad units DTPa, a plurality of gate test pad units GTP, a plurality of second data test pad units DTPb, first and second dummy pad units DUM1 and DUM2, and first and second voltage supply pad units VSPa and VSPb.

The plurality of first data test pad units DTPa may be disposed at one end of the test pad unit TP. The plurality of first data test pad units DTPa may be connected to the first data pad unit DPa through the first fan out lines FOL1, the connection line unit CLU, and the second fan out lines FOL2.

The plurality of first data test pad units DTPa may include first-first to first-sixth data test pad units DTP1, DTP2, DTP3, DTP4, DTP5, and DTP6. Some of the first-first to first-sixth data test pad units DTP1, DTP2, DTP3, DTP4, DTP5, and DTP6 may supply data test voltages to pixels SP outputting light of a first color among the plurality of pixels SP. Some of the first-first to first-sixth data test pad units DTP1, DTP2, DTP3, DTP4, DTP5, and DTP6 may supply data test voltages to pixels SP outputting light of a second color among the plurality of pixels SP. Others of the first-first to first-sixth data test pad units DTP1, DTP2, DTP3, DTP4, DTP5, and DTP6 may supply data test voltages to pixels SP outputting light of a third color among the plurality of pixels SP. Here, light of the first, second, and third colors output by the pixels SP may be red light, green light, and blue light, but is not limited thereto.

The plurality of second data test pad units DTPb may be disposed at the other end of the test pad unit TP. The plurality of second data test pad units DTPb may be connected to the second data pad unit DPb through the first fan-out lines FOL1, the connection line unit CLU, and the second fan-out lines FOL2. The plurality of second data test pad units DTPb may include second-first to second-sixth data test pad units DTP1, DTP2, DTP3, DTP4, DTP5, and DTP6. The plurality of first data test pad units DTPa are different from the plurality of second data test pad units DTPb in arrangement, but the plurality of first data test pad units DTPa are substantially the same as the plurality of second data test pad units DTPb in structure and function. Therefore, a description of the plurality of second data test pad units DTPb will be omitted.

The plurality of gate test pad units GTP may be disposed between the plurality of first data test pad units DTPa and the plurality of second data test pad units DTPb. The plurality of gate test pad units GTP may include first to fourth gate test pad units GTP1, GTP2, GTP3, and GTP4. Each of the first to fourth gate test pad units GTP1, GTP2, GTP3, and GTP4 may supply a gate test signal to the plurality of horizontal gate lines HGL through the plurality of vertical gate lines VGL.

The first dummy pad unit DUM1 may be disposed between the first data test pad unit DTPa and the gate test pad unit GTP. The first dummy pad unit DUM1 may prevent electrostatic capacitance from being formed between the first data test pad unit DTPa and the gate test pad unit GTP, or may prevent the occurrence of signal interference therebetween.

The second dummy pad unit DUM2 may be disposed between the gate test pad unit GTP and the second data test pad unit DTPb. The second dummy pad unit DUM2 may prevent electrostatic capacitance from being formed between the gate test pad unit GTP and the second data test pad unit DTPb, or may prevent the occurrence of signal interference therebetween.

The first and second voltage supply pad units VSPa and VSPb may be disposed at both end of the test pad unit TP, respectively. For example, the first and second voltage supply pad portions VSPa and VSPb may be connected to a common voltage pad and a storage voltage pad of the first substrate 110, respectively.

Figure 19:
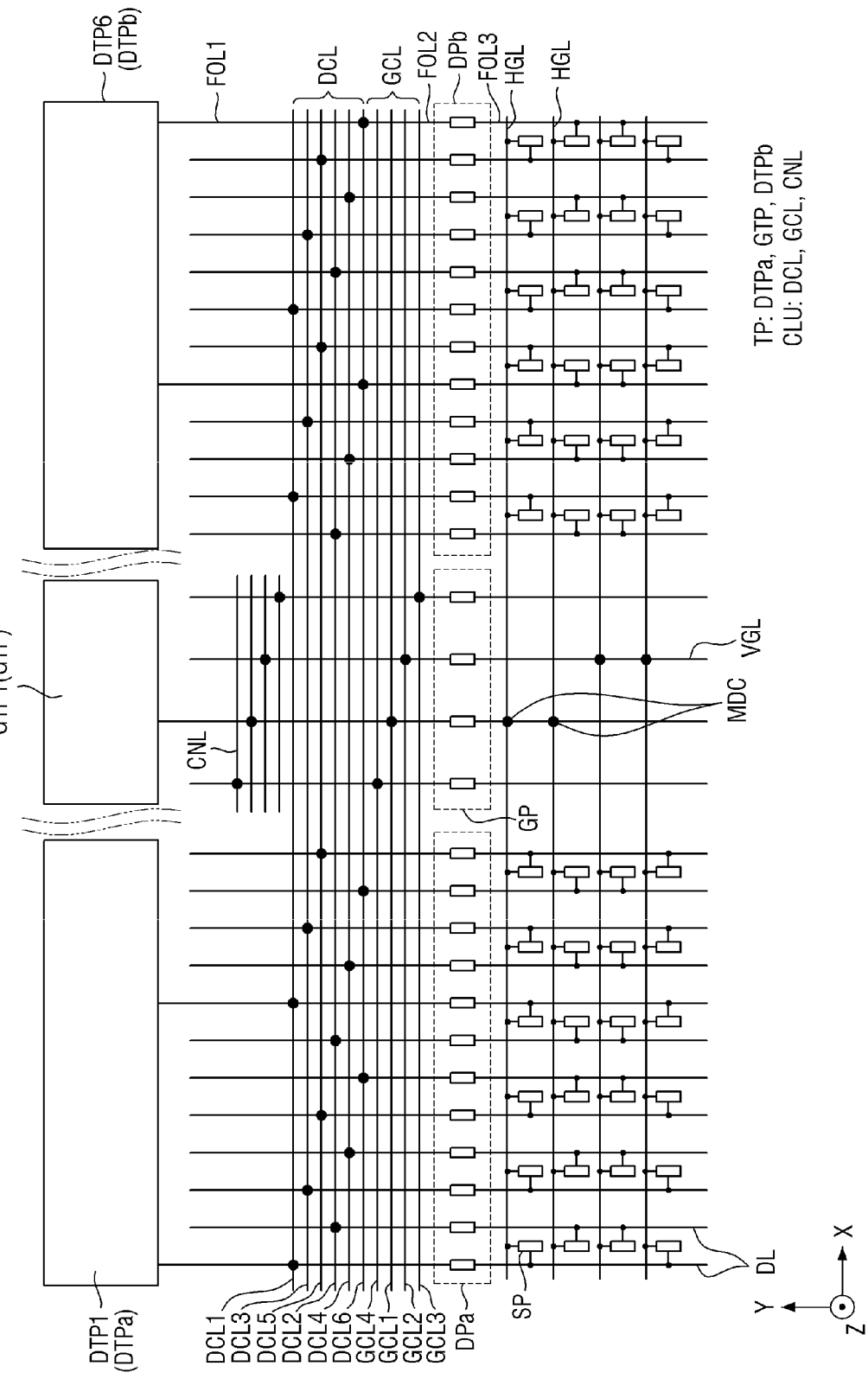
FIG. 19 is showing a connection relationship between a test pad and a pixel in the method of inspecting a display device according to an embodiment.

FIG. 19 is a view showing a connection relationship between a test pad and a pixel in the method of inspecting a display device according to an embodiment.

Referring to FIG. 19, the test pad unit TP may be connected to the panel pad unit PP through the first fan-out lines FOL1, the connection line unit CLU, and the second fan-out lines FOL2.

The connection line unit CLU may include a data connection line DCL, a gate connection line GCL, and a gate contact line CNL.

The data connection line DCL may intersect the first fan-out line FOL1 and the second fan-out line FOL2. For example, the plurality of first fan-out lines FOL1 may extend in the second direction (Y-axis direction), and may be spaced apart from each other in the first direction (X-axis direction). The plurality of second fan out lines FOL2 may extend in the second direction (Y-axis direction), and may be spaced apart from each other in the first direction (X-axis direction). The plurality of data connection lines DCL may extend in the first direction (X-axis direction), and may be spaced apart from each other in the second direction (Y-axis direction). The plurality of data connection lines DCL may include first to sixth data connection lines DCL1, DCL2, DCL3, DCL4, DCL5, and DCL6.

Some of the plurality of first fan-out lines FOL1 may be connected to the plurality of first data pad units DPa one-to-one through the second fan-out lines FOL2. Some of the plurality of first fan-out lines FOL1 corresponding to the plurality of first data pad units DPa may be connected to the first-first data test pad unit DTP1. Others of the plurality of first fan-out lines FOL1 corresponding to the plurality of first data pad units DPa may not be connected to the first-first data test pad unit DTP1. For example, the first-first data test pad unit DTP1 may be connected to some of the plurality of first fan-out lines FOL1, and some of the first fan-out lines FOL1 may be connected to the first data connection line DCL1. The first data connection line DCL1 may extend to an area where the first-first data test pad unit DTP1 is not disposed, and may supply a data test voltage to the second fan-out line FOL2 in place of the first fan-out line FOL1 that is not directly connected to the first-first data test pad unit DTP1.

Accordingly, each of the first to sixth data connection lines DCL1, DCL2, DCL3, DCL4, DCL5, and DCL6 may supply a data test voltage to the second fan-out line FOL2 extending from the corresponding first fan-out line FOL1 in place of the first fan-out line FOL1 that is not directly connected to the plurality of first data test pad units DTPa.

The gate connection line GCL may intersect the first fan-out line FOL1 and the second fan-out line FOL2. For example, the plurality of first fan-out lines FOL1 may extend in the second direction (Y-axis direction), and may be spaced apart from each other in the first direction (X-axis direction). The plurality of second fan-out lines FOL2 may extend in the second direction (Y-axis direction), and may be spaced apart from each other in the first direction (X-axis direction). The plurality of gate connection lines GCL may extend in the first direction (X-axis direction), and may be spaced apart from each other in the second direction (Y-axis direction). The plurality of gate connection lines GCL may include first to fourth gate connection lines GCL1, GCL2, GCL3, and GCL4.

Some of the plurality of first fan-out lines FOL1 may be connected to the plurality of gate pad units GP one-to-one through the second fan-out lines FOL2. Some of the plurality of first fan out lines FOL1 corresponding to each of the plurality of gate pad parts GP may be connected to the first gate test pad part GTP1. Some of the plurality of first fan-out lines FOL1 corresponding to the plurality of gate pad units GP may be connected to the first gate test pad unit GTP1. Others of the plurality of first fan-out lines FOL1 corresponding to the plurality of gate pad units GP may not be connected to the first gate test pad unit GTP1. For example, the first gate test pad unit GTP1 may be connected to some of the plurality of first fan out lines FOL1, and some of the first fan out lines FOL1 may be connected to the first gate connection line GCL1. The first gate connection line GL1 may extend to an area where the first gate test pad unit GTP1 is not disposed, and may supply a gate test voltage to the second fan-out line FOL2 in place of the first fan-out line FOL1 that is not directly connected to the first gate test pad unit GTP1.

Accordingly, each of the first to fourth gate connection lines GCL1, GCL2, GCL3, and GCL4 may supply a gate test voltage to the second fan-out line FOL2 extending from the corresponding first fan-out line FOL1 in place of the first fan-out line FOL1 that is not directly connected to the plurality of gate test pad units GTP.

The gate contact line CNL may cross the first fan-out line FOL1. For example, the plurality of first fan-out lines FOL1 may extend in the second direction (Y-axis direction), and may be spaced apart from each other in the first direction (X-axis direction). The plurality of gate contact lines CNL may extend in a first direction (X-axis direction), and may be spaced apart from each other in a second direction (Y-axis direction). One of the plurality of gate test pad units GTP may be connected to the corresponding gate contact line CNL through the first fan-out line FOL1. The plurality of gate contact lines CNL may reduce the contact resistances of the first and second fan-out lines FOL1 and FOL2 corresponding to the plurality of gate pad units GP.

Accordingly, in the method of inspecting a display device, lighting inspection may be performed by using the first and second data pad units DPa and DPb and the gate pad unit GP disposed at one end of the first substrate 110, thereby reducing the non-display area of a display device, improving the reliability of a display device, and reducing the cost for light inspection.

Figure 20:
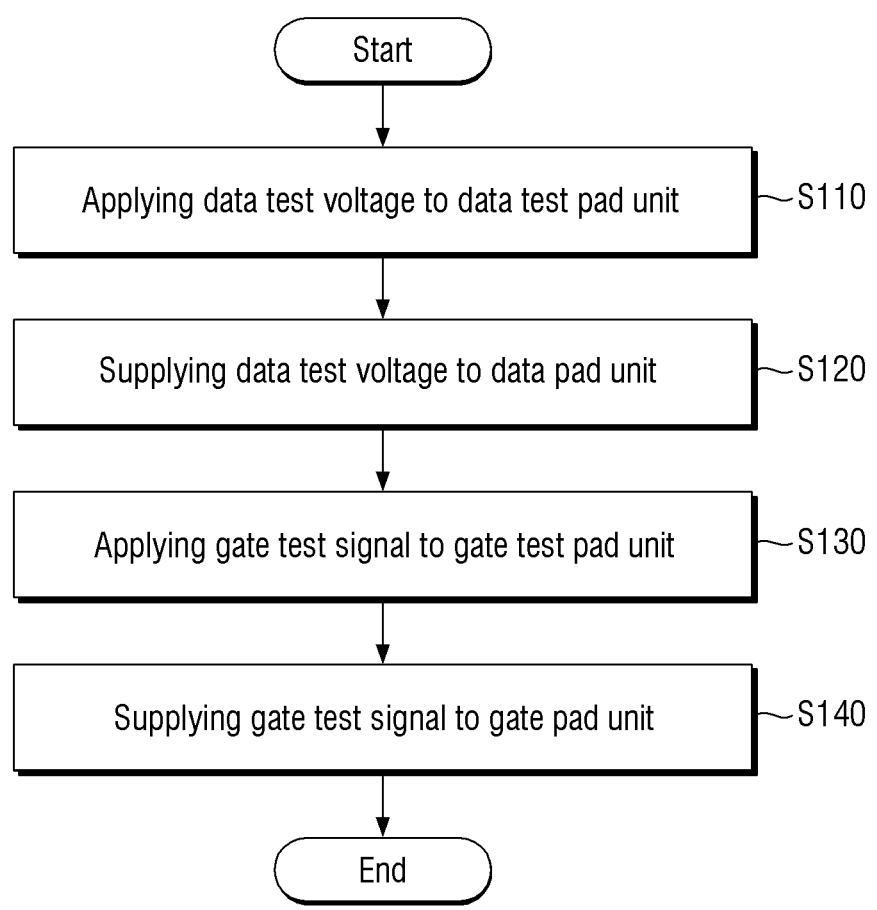
FIG. 20 is a flowchart showing a process of inspecting a display device according to an embodiment.

FIG. 20 is a flowchart showing a process of inspecting a display device according to an embodiment.

Referring to FIG. 20, the external light source (not shown) may apply a data test voltage to the first or second data test pad units DTPa and DTPb disposed on the third substrate 130 (step S110).

The first or second data test pad unit DTPa or DTPb may supply a data test voltage to the first or second data pad unit DPa or DPb disposed at one end of the first substrate 110 through the first fan-out line FOL1, the data connection line DCL, and the second fan-out line FOL2 (step S120).

The external light source (not shown) may apply a gate test signal to the gate test pad unit GTP disposed on the third substrate 130 (step S130).

The gate test pad unit GTP may supply a gate test signal to the gate pad unit GP disposed at one side of the first substrate 110 through the first fan-out line FOL1, the gate connection line GCL, and the second fan-out line FOL2 (step S140).

Figure 21:
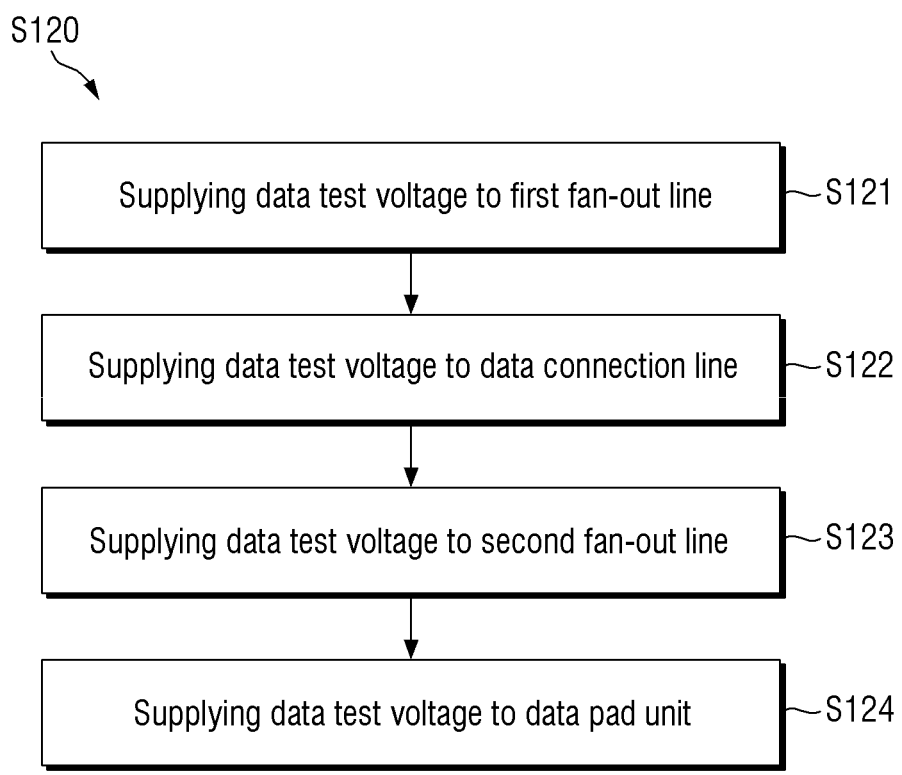
FIG. 21 is a flowchart showing a process of supplying a data test voltage in the method of inspecting a display device according to an embodiment.

FIG. 21 is a flowchart showing a process of supplying a data test voltage in the method of inspecting a display device according to an embodiment.

Referring to FIG. 21 together with FIG. 20, the step of supplying the data test voltage (step 120) may include steps 121, 122, 123 and 124 below.

Each of the first and second data test pad units DTPa and DTPb may supply a data test voltage to some of the plurality of first fan-out lines FOL1 (step S121).

Some of the first fan-out lines FOL1 connected to the first or second data test pad unit DTPa or DTPb may supply the data test voltage to the corresponding data connection line DCL (step S122).

The data connection line DCL may supply the data test voltage to the corresponding second fan-out line FOL2 (step S123).

The second fan-out line FOL2 may supply the data test voltage to the corresponding first or second data pad unit DPa or DPb (step S124).

Accordingly, in the method of inspecting a display device, the data test voltage may be stably supplied to the first or second data pad unit DPa or DPb through the first fan-out line FOL1, the data connection line DCL, and the second fan-out line FOL2.

Figure 22:
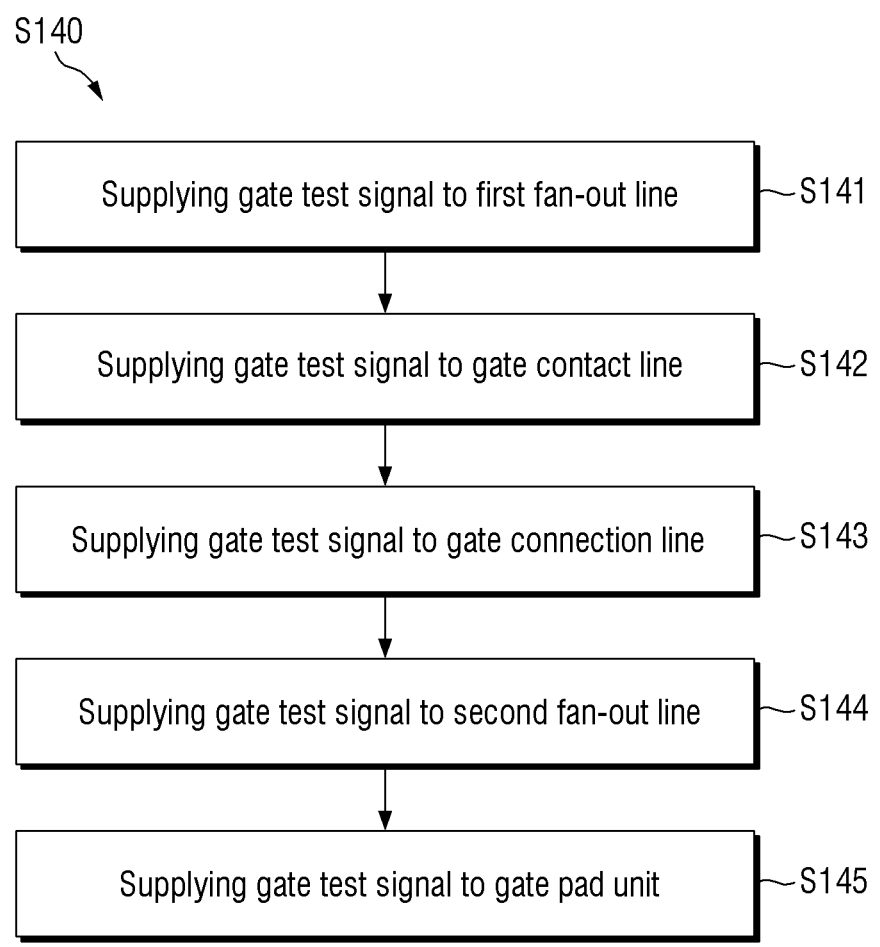
FIG. 22 is a flowchart showing a process of supplying a gate test signal in the method of inspecting a display device according to an embodiment.

FIG. 22 is a flowchart showing a process of supplying a gate test signal in the method of inspecting a display device according to an embodiment.

Referring to FIG. 22 together with FIG. 20, the step of supplying the gate test voltage (step 140) may include steps 141, 142, 143, and 144 below.

The gate test pad unit GTP may supply a gate test signal to some of the plurality of first fan-out lines FOL1 (step S141).

Some of the first fan-out lines FOL1 connected to the gate test pad unit GTP may supply the gate test signal to the corresponding gate connection line GCL (step S142).

The gate connection line GCL may supply the gate test signal to the corresponding second fan-out line FOL2 (step S143).

The second fan-out line FOL2 may supply the gate test signal to the corresponding gate pad unit GP (step S144).

Accordingly, in the method of inspecting a display device, the gate test signal may be stably supplied to the gate pad unit GP through the first fan-out line FOL1, the gate connection line GCL, and the second fan-out line FOL2.

Figure 23:
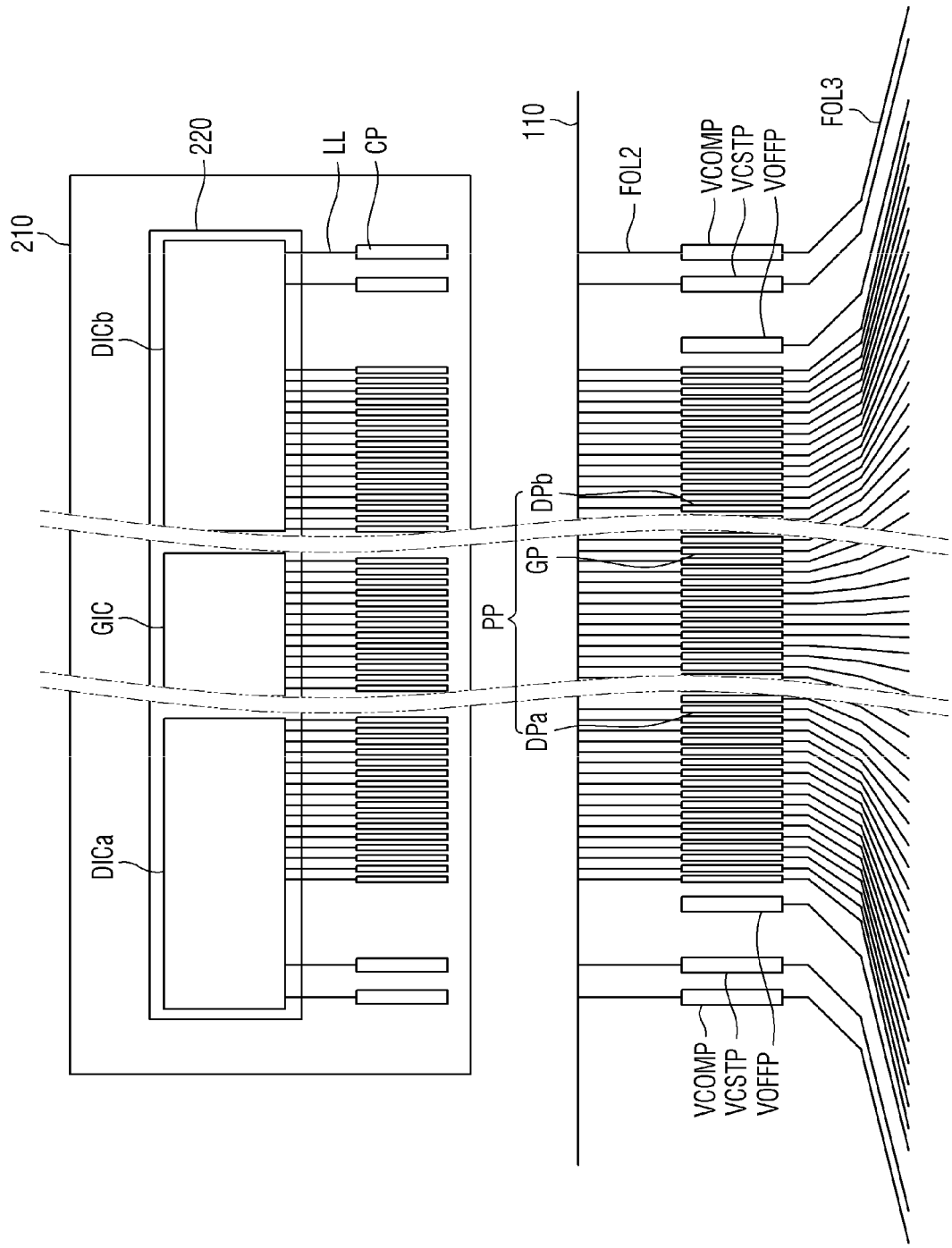
FIG. 23 is showing a connection relationship between a display driving circuit and a panel pad unit in a method of inspecting a display device according to another embodiment.

FIG. 23 is a view showing a connection relationship between a display driving circuit and a panel pad unit in a method of inspecting a display device according to another embodiment.

Referring to FIG. 23, the display driving circuit 220 may include a first data driver DICa, a gate driver GIC, and a second data driver DICb. For example, one display driving circuit 220 may correspond to one flexible film 210 and one panel pad unit PP. Each of the plurality of display driving circuits 220 may be connected to each of the plurality of panel pad units PP.

The first data driver DICa may be disposed at one end of the display driving circuit 220, and the second data driver DICb may be disposed at the other end of the display driving circuit 220. The first data driver DICa is different from the second data driver DICb in arrangement, but the first data driver DICa may be substantially the same as the second data driver DICb in structure and function. The first and second data drivers DICa and DICb may be connected to a contact pad CP of the flexible film 210 through a lead line LL. The contact pad CP of the flexible film 210 may be connected to the panel pad unit PP of the first substrate 110. Accordingly, each of the first and second data driving units DICa and DICb may supply a data voltage to each of the first and second data pad units DPa and DPb.

The gate driver GIC may be disposed between the first and second data drivers DICa and DICb. The gate driver GIC may be connected to the contact pad CP of the flexible film 210 through the lead line LL. The contact pad CP of the flexible film 210 may be connected to the panel pad unit PP of the first substrate 110. Therefore, the gate driver GIC can supply a gate signal to the gate pad unit GP.

The first substrate 110 may further include a common voltage pad VCOMP, a storage voltage pad VCSTP, and an off voltage pad VOFFP. The common voltage pad VCOMP may receive a common voltage from the first or second data driving unit DICa or DICb or the power supply unit 250. The storage voltage pad VCSTP may receive a storage voltage from the first or second data driving units DICa or DICb or the power supply unit 250. For example, the off voltage pad VOFFP may receive an off voltage from the first or second data driving units DICa or DICb or the power supply unit 250. For another example, the off voltage pad VOFFP may be floated or grounded.

Accordingly, in the method of inspecting a display device, lighting inspection may be performed by using the first and second data drivers DICa and DICb and the gate driver GIC attached onto the flexible film 210, thereby reducing the non-display area of a display device, improving the reliability of a display device, and reducing the cost for light inspection.

Figure 24:
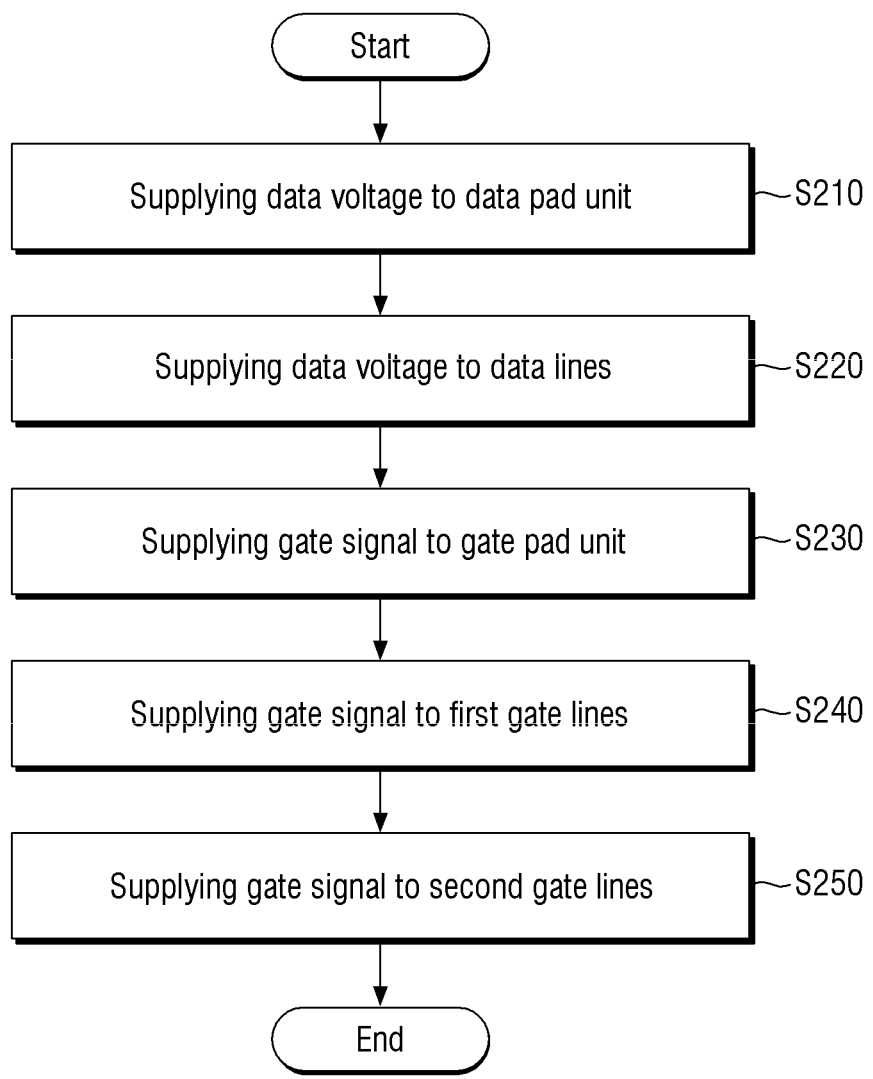
FIG. 24 is a flowchart showing a process of inspecting a display device according to another embodiment.

FIG. 24 is a flowchart showing a process of inspecting a display device according to another embodiment.

Referring to FIG. 24, each of the first and second data driving units DICa and DICb may supply a data voltage to each of the first and second data pad units DPa and DPb (step S210). The first and second data pad units DPa and DPb may supply data voltages to the plurality of data lines DL (step S220).

The gate driver GIC may supply a gate signal to the gate pad unit GP (step S230). The gate pad unit GP may supply gate signals to the plurality of vertical gate lines VGL (step S240). Each of the plurality of vertical gate lines VGL may supply a gate signal to each of the plurality of horizontal gate lines HGL (step S250).

The effects of the present disclosure are not limited by the foregoing, and other various effects are anticipated herein.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A display device, comprising:
a plurality of data lines extending in one direction;
a plurality of first gate lines arranged in parallel with the plurality of data lines;
a plurality of second gate lines intersecting the plurality of first gate lines;
a line contact portion in which each of the plurality of first gate lines and each of the plurality of second gate lines are in contact with each other;
a non-contact portion in which each of the plurality of first gate lines and each of the plurality of second gate lines are insulated from each other at an intersection area thereof;
a first pixel including a first switching element connected to a corresponding second gate line among the plurality of second gate lines and disposed adjacent to the line contact portion; and
a second pixel including a second switching element connected to the second gate line connected to the first pixel and disposed adjacent to the non-contact portion,
wherein magnitude of a first capacitance of the first switching element between a gate electrode and a first electrode of the first switching element is different from magnitude of a first capacitance of the second switching element between a gate electrode and a first electrode of the second switching element.

2. The display device of claim 1,
wherein the magnitude of the first capacitance of the first switching element is smaller than the magnitude of the first capacitance of the second switching element.

3. The display device of claim 1,
wherein the first electrode of the first switching element is connected to a first pixel electrode of the first switching element, and the first electrode of the second switching element is connected to a second pixel electrode of the second switching element, and
wherein size of an overlapping area between the gate electrode and the first electrode of the first switching element is smaller than size of an overlapping area between the gate electrode and the first electrode of the second switching element.

4. The display device of claim 1,
wherein size of the gate electrode of the first switching element is smaller than size of the gate electrode of the second switching element.

5. The display device of claim 1,
wherein size of an active region of the first switching element is smaller than size of an active region of the second switching element.

6. The display device of claim 1,
wherein the first electrode of the first switching element is connected to a first pixel electrode of the first switching element, and the first electrode of the second switching element is connected to a second pixel electrode of the second switching element, and
wherein size of the first electrode of the first switching element is smaller than size of the first electrode of the second switching element.

7. The display device of claim 1,
wherein magnitude of a second capacitance of the first switching element between a first pixel electrode of the first pixel and an adjacent first gate line among the plurality of first gate lines is different from magnitude of a second capacitance of the second switching element between a second pixel electrode of the second pixel and an adjacent first gate line among the plurality of first gate lines.

8. The display device of claim 7,
wherein the magnitude of the second capacitance of the first switching element is greater than the magnitude of the second capacitance of the second switching element.

9. The display device of claim 1,
wherein, when the gate electrode of the first switching element receives a gate-on voltage from the second gate line, a first gate line adjacent to the first pixel, among the plurality of first gate lines, supplies a gate-on voltage.

10. The display device of claim 1,
wherein, when the gate electrode of the second switching element receives a gate-on voltage from the second gate line, a first gate line adjacent to the second pixel, among the plurality of first gate lines, has a gate-off voltage.

11. A display device, comprising:
a plurality of first gate lines extending in a first direction;
a plurality of second gate lines extending in a second direction intersecting the first direction;
a line contact portion in which each of the plurality of first gate lines and each of the plurality of second gate lines are in contact with each other;
a non-contact portion in which each of the plurality of first gate lines and each of the plurality of second gate lines are insulated from each other at an intersection area thereof;
a first pixel including a first switching element connected to a corresponding second gate line among the plurality of second gate lines and disposed adjacent to the line contact portion;

a second pixel including a second switching element connected to the second gate line connected to the first pixel and disposed adjacent to the non-contact portion; and a third pixel including a third switching element connected to the second gate line connected to the first pixel and the second pixel and disposed between the first switching element and the second switching element, wherein magnitudes of first capacitances between gate electrodes and first electrodes of each of the first, second, and third switching elements are different from each other.

12. The display device of claim 11, wherein the magnitude of the first capacitance of the third switching element is greater than the magnitude of the first capacitance of the first switching element, and the magnitude of the first capacitance of the second switching element is greater than the magnitude of the first capacitance of the third switching element.

13. The display device of claim 11, wherein the first electrode of the first switching element is connected to a first pixel electrode of the first switching element, the first electrode of the second switching element is connected to a second pixel electrode of the second switching element, and the first electrode of the third switching element is connected to a third pixel electrode of the third switching element, and wherein size of an overlapping area between the gate electrode and the first electrode of the third switching element is greater than size of an overlapping area between the gate electrode and the first electrode of the first switching element, and size of an overlapping area between the gate electrode and the first electrode of the second switching element is greater than size between an overlapping area of the gate electrode and the first electrode of the third switching element.

14. The display device of claim 11, wherein size of the gate electrode of the third switching element is greater than size of the gate electrode of the first switching element, and size of the gate electrode of the second switching element is greater than size of the gate electrode of the third switching element.

15. The display device of claim 11, wherein size of an active region of the third switching element is greater than size of an active region of the first switching element, and size of an active region of the second switching element is greater than size of an active region of the third switching element.

16. The display device of claim 11, wherein the first electrode of the first switching element is connected to a first pixel electrode of the first switching element, the first electrode of the second switching element is connected to a second pixel electrode of the second switching element, and the first electrode of the third switching element is connected to a third pixel electrode of the third switching element, and wherein size of the first electrode of the third switching element is greater than size of the first electrode of the first switching element, and size of the first electrode of the second switching element is greater than size of the first electrode of the third switching element.

17. A display device, comprising:

a substrate having a display area and a non-display area and including a gate pad unit and a data pad unit disposed at one end of the non-display area;

a flexible film connected to each of the gate pad unit and the data pad unit; and a display driving circuit disposed on the flexible film, wherein the substrate includes:

a plurality of data lines extending in one direction in the display area;

a plurality of first gate lines arranged in parallel to the plurality of data lines;

a plurality of second gate lines crossing the plurality of first gate lines;

line contact portions in which each of the plurality of first gate lines contacts each of the plurality of second gate lines;

non-contact portions in which each of the plurality of first gate lines and each of the plurality of second gate lines insulated from each other at intersection areas thereof;

a plurality of first pixels including a first switching element connected to the corresponding second gate line of the plurality of second gate lines and disposed adjacent to the line contact portions; and a plurality of second pixels including a second switching element connected to the second gate line connected to the first pixel and disposed adjacent to the non-contact portions, and wherein the display driving circuit includes:

a data driver connected to the data pad unit to supply a data voltage to the plurality of data lines; and a gate driver connected to the gad pad unit to supply a gate signal to the plurality of first gate lines.

18. The display device of claim 17, wherein the substrate further includes:

a plurality of third pixels including a third switching element connected to the second gate line which is connected to the first switching element and the second switching element and disposed between the first switching element and the second switching element.

19. The display device of claim 18, wherein the plurality of third pixels include:

a third-first pixel connected to a first data line among the plurality of data lines and a second-first gate line among the plurality of second gate lines;

a third-second pixel disposed under the third-first pixel and connected to a second data line among the plurality of data lines and the second-first gate line;

a third-third pixel disposed under the third-second pixel and connected to the second data line and a second-second gate line among the plurality of second gate lines; and a third-fourth pixel disposed under the third-third pixel and connected to the first data line and the second-second gate line.

20. A method of inspecting a display device, comprising steps of:

applying a data test voltage to a data test pad unit disposed on a second substrate and supplying the data test voltage to a data pad unit connected to the data test pad unit and disposed at one end of a first substrate; and applying a gate test signal to a gate test pad unit disposed on the second substrate and supplying the gate test signal to a gate pad unit connected to the gate test pad unit and disposed at one end of the first substrate, wherein the data pad unit and the gate pad unit are arranged in a first direction on the first substrate, the data test pad unit and the gate test pad unit are arranged in the first direction on the second substrate.

21. The method of claim 20,
wherein the supplying the data test voltage is accomplished by
allowing the data test pad unit to supply a data test voltage to a first fan-out line,
by the first fan-out line, supplying the data test voltage to a data connection line intersecting the first fan-out line,
by the data connection line, supplying the data test voltage to a second fan-out line extending from the first fan-out line, and
by the second fan-out line, supplying the data test voltage to the data pad unit.

22. The method of claim 20,
wherein the supplying the gate test signal is accomplished by
by the gate test pad unit, supplying a gate test signal to a first fan-out line;
by the first fan-out line, supplying the gate test signal to a gate connection line intersecting the first fan-out line;
by the gate connection line, supplying the gate test signal to a second fan-out line extending from the first fan-out line; and
by the second fan-out line, supplying the gate test signal to the gate pad unit.

23. The method of claim 22,
wherein the supplying the gate test signal further is accomplished by
by the first fan-out line, supplying the gate test signal to a gate contact line which is parallel to the gate connection line.

24. A method of inspecting a display device, comprising steps of:
supplying data voltages to a plurality of data pad units disposed at one end of a substrate;
by the data pad units, supplying the data voltages to a plurality of data lines extending in one direction through a plurality first fan-out lines;
supplying gate signals to a plurality of gate pad units disposed between the data pad units at one end of the substrate;
by the gate pad unit, supplying the gate signals to a plurality of first gate lines parallel to the plurality of data lines through a plurality second fan-out lines; and
by each of the plurality of first gate lines, supplying the gate signals to each of a plurality of second gate lines intersecting the plurality of first gate lines,
wherein the first fan-out lines and the second fan-out lines do not intersect with each other.

25. The method of claim 24,
wherein the supplying the data voltages to the data pad units is accomplished by allowing a data driver to supply the data voltages to the data pad units through a lead line of a flexible film, the data driver being disposed on the flexible film attached to one side of the substrate.

26. The method of claim 25,
wherein the supplying the gate signals to the gate pad units is accomplished by allowing a gate driver to supply the gate signals to the gate pad units through the lead line of the flexible film, the gate driver being disposed on the flexible film.

* * * * *